(12) United States Patent
Ding et al.

(10) Patent No.: US 11,317,311 B2
(45) Date of Patent: Apr. 26, 2022

(54) SPATIAL REUSE METHOD AND APPARATUS

(71) Applicant: HUAWEI TECHNOLOGIES CO., LTD., Guangdong (CN)

(72) Inventors: Changfeng Ding, Chengdu (CN); Xiao Han, Shenzhen (CN); Rong He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/988,082

(22) Filed: Aug. 7, 2020

(65) Prior Publication Data

US 2020/0374732 A1 Nov. 26, 2020

Related U.S. Application Data

(63) Continuation of application No. PCT/CN2019/071997, filed on Jan. 16, 2019.

(30) Foreign Application Priority Data

Feb. 12, 2018 (CN) .......................... 201810144064.7

(51) Int. Cl.
*H04W 24/10* (2009.01)
*H04W 72/04* (2009.01)
*H04W 72/08* (2009.01)

(52) U.S. Cl.
CPC ......... *H04W 24/10* (2013.01); *H04W 72/046* (2013.01); *H04W 72/0426* (2013.01); *H04W 72/085* (2013.01)

(58) Field of Classification Search
CPC ............. H04W 24/10; H04W 72/0426; H04W 72/046; H04W 72/085; H04W 48/12; H04W 88/08; H04W 24/02; H04W 84/12
See application file for complete search history.

(56) References Cited

U.S. PATENT DOCUMENTS

| 2012/0106474 A1* | 5/2012 | Wu ................. | H04B 7/0619 |
| | | | 370/329 |
| 2016/0316484 A1* | 10/2016 | Feng ................ | H04W 72/0446 |
| 2019/0246302 A1* | 8/2019 | Park ................ | H04W 24/10 |

FOREIGN PATENT DOCUMENTS

| CN | 105978614 A | 9/2016 |
| CN | 106961733 A | 7/2017 |

(Continued)

OTHER PUBLICATIONS

Ropitault, Tanguy, "Evaluation of RTOT algorithm: a first implementation of OBSS_PD-based SR method for IEEE 802.11ax .", 2018 15th IEEE Annual Consumer Communications and Networking Conference (CCNC). (7 pages).

(Continued)

*Primary Examiner* — Chuong A Ngo
(74) *Attorney, Agent, or Firm* — WHDA, LLP

(57) ABSTRACT

Embodiments of the present application provide a spatial reuse method. The method includes: receiving, by a first node in BSS1, a measurement request sent by a second node in BSS2, where one or more first service periods SP1 are allocated in the BSS1, one or more second service periods SP2 are allocated in the BSS2, and the measurement request is used to request to measure the one or more second service periods SP2; receiving, by the first node in the BSS1, a measurement report of the second node in the BSS2, where the measurement report is a report of measuring the one or more first service periods SP1; and determining, by the first node in the BSS1 based on the received measurement report, whether to allow spatial reuse of the one or more first service periods SP1 and the one or more second service periods SP2.

15 Claims, 19 Drawing Sheets

(56) References Cited

FOREIGN PATENT DOCUMENTS

| CN | 107548570 A | 1/2018 |
|----|-------------|--------|
| CN | 107645788 A | 1/2018 |
| CN | 109391455 A | 2/2019 |

OTHER PUBLICATIONS

Kerstin Johnsson (Intel): "Distributed Scheduling", IEEE 802.11-17/1474r1, Sep. 12, 2017. (7 pages).
IEEE Std 802.11ad-2012 Part 11: Wireless LAN Medium Access Control (MAC) and Physical Layer (PHY) Specifications, Amendment 3: Enhancements for Very High Throughput in the 60 GHz Band, IEEE Computer Society, Oct. 19, 2012. (628 pages).
IEEE P802.11ay/D0.35, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, May 2017. (256 pages).
International Search Report dated Apr. 8, 2019, issued in counterpart PCT Application No. PCT/CN2019/071997, with English translation. (11 Pages).

\* cited by examiner

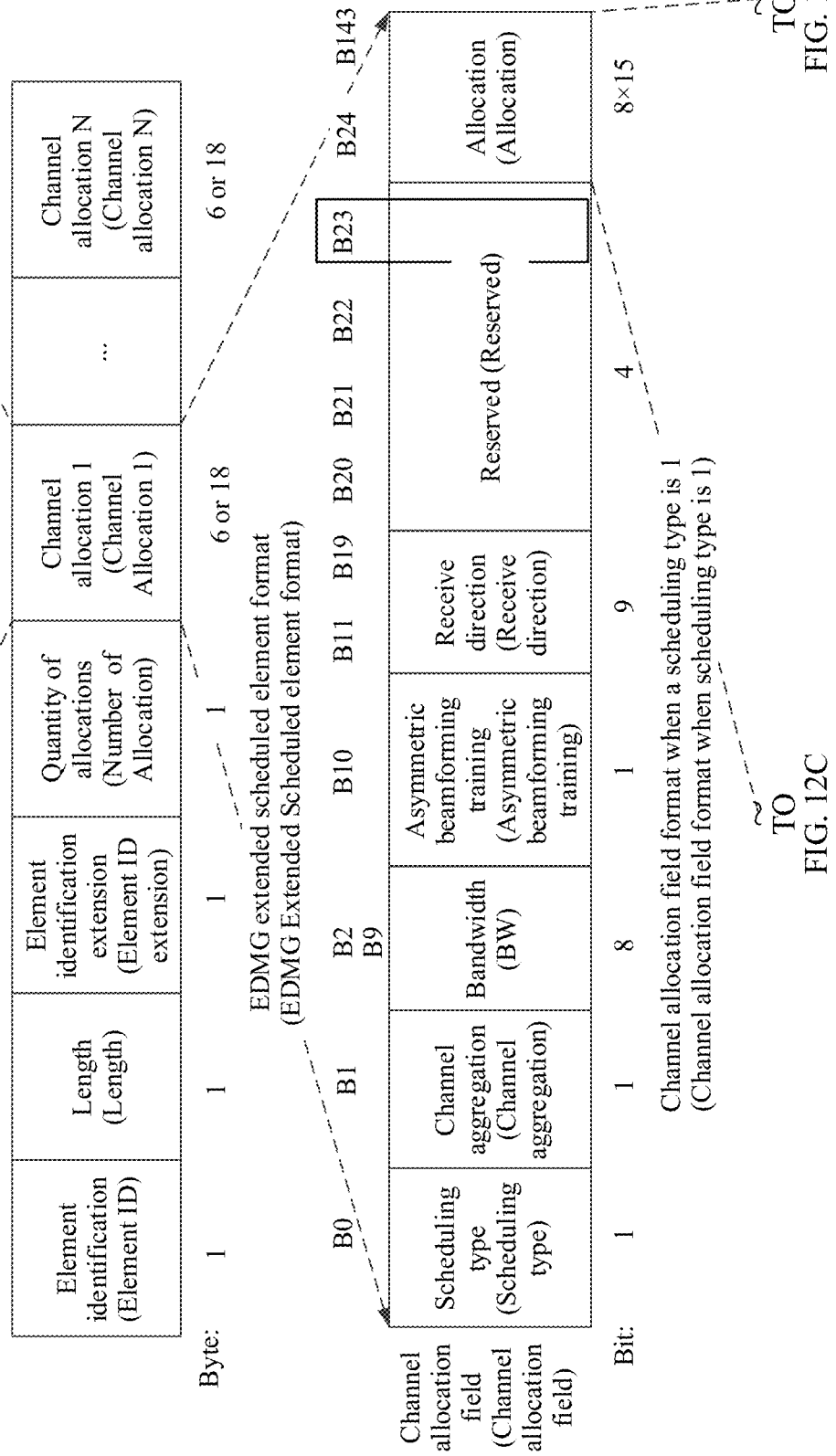

FIG. 12C

| Byte: | 2 | | | | | | 2 |
|---|---|---|---|---|---|---|---|
| | Allocation control (Allocation control) | Beamforming training control (BF control) | Source association identifier (Source AID) | Destination association identifier (Destination AID) | Allocation start (Allocation start) | Allocation block duration (Allocation block duration) | Quantity of blocks (Number of blocks) | Allocation block period (Allocation block period) |
| | | 2 | 1 | 1 | 4 | 2 | 1 | 2 |

CONT. FROM FIG. 12B (Allocation control)
CONT. FROM FIG. 12B (Allocation block period)

| Bit: | B0 B3 | B4 | B6 | B7 | B8 | B9 | B10 | B11 | B12 B15 |
|---|---|---|---|---|---|---|---|---|---|
| | Allocation identification (Allocation ID) | Allocation type (Allocation type) | Pesudo-static (Pesudo-static) | Truncatable (Truncatable) | Extendable (Extendable) | PCP active (PCP active) | LP SC used (LP SC Used) | Reserved (Reserved) |
| | 4 | 3 | 1 | 1 | 1 | 1 | 1 | 4 |

SPATIAL REUSE METHOD AND APPARATUS

CROSS-REFERENCE TO RELATED APPLICATIONS

This application is a continuation of International Application No. PCT/CN2019/071997, filed on Jan. 16, 2019, which claims priority to Chinese Patent Application No. 201810144064.7, filed on Feb. 12, 2018. The disclosures of the aforementioned applications are incorporated herein by reference in their entireties.

STATEMENT OF JOINT RESEARCH AGREEMENT

The subject matter and the claimed invention were made by or on the behalf of Southwest Jiaotong University, of West Section, High-tech Zone, Xi'an, Shaanxi 611756, P.R. China and Huawei Technologies Co., Ltd., of Shenzhen, Guangdong Province, P.R. China, under a joint research agreement titled "Research Project for Next Generation 60 GHz Wi-Fi MAC Technology". The joint research agreement was in effect on or before the claimed invention was made, and the claimed invention was made as a result of activities undertaken within the scope of the joint research agreement.

TECHNICAL FIELD

This application relates to the communications field, and in particular, to a spatial reuse technology.

BACKGROUND

In 60 GHz millimeter wave communication, millimeter wave transmission has a relatively short distance and a high path loss. To meet service requirements of dense users and offset the relatively short communication distance, APs (Chinese full name: access point, English full name: access point) are deployed densely, for example, in a meeting room and a waiting hall. Coverage areas of the APs usually overlap. Although millimeter-wave directional beams have spatial isolation and spatial reuse effects, between two BSSs (Chinese full name: basic service set, English full name: basic service set) and in a scenario of relatively dense users, communications links of different BSSs may still interfere with each other, where a BSS may be a communication coverage range formed by an AP. In 802.11ad and 802.11ay, to protect data communication and a priority of a user, an SP (Chinese full name: service period, English full name: service period) based channel resource scheduling method is used. In SP scheduling, an AP allocates a time period to a user. Only the user to which the time period is allocated can perform communication in this time period, and a source user to which the time period is allocated sends data at the beginning of an SP, and does not use a conventional CCA (Chinese full name: clear channel assessment, English full name: clear channel assessment) detection and back-off process. The SP-based transmission manner ensures reliability of communication in a BSS As shown in FIG. 1, in 802.11ad/ay, one BI (Chinese full name: beacon interval, English full name: beacon interval) is divided into a BHI (Chinese full name: beacon header interval, English full name: beacon header interval) and a DTI (Chinese full name: data transfer interval, English full name: data transfer interval), the BHI may further be divided into a BTI (Chinese full name: beacon transmission interval, English full name: beacon transmission interval), A-BFT (Chinese full name: association beamforming training, English full name: association beamforming training), and an ATI (Chinese full name: announcement transmission interval, English full name: announcement transmission interval), and the DTI may further be divided into a CBAP (Chinese full name: contention based access period, English full name: contention based access period) and an SP.

An interval in a DTI is scheduled by using the following two methods:

(1) when a BHI includes an ATI, the interval in the DTI is scheduled by an AP in the ATI through polling and responding between the AP and a STA (Chinese full name: station, English full name: station); and (2) when a BHI does not include an ATI (the ATI is optional), when sending a beacon in a BTI, the AP adds an ESE (Chinese full name: extended schedule element, English full name: extended schedule element) to the beacon, to complete scheduling of a user.

In addition, in the 802.11ad standard, to improve spatial utilization, and improve a throughput, a spatial reuse and interference canceling mechanism is proposed. In the spatial reuse mechanism of the 802.11ad, SPs of different STAs in a same spatial area can be scheduled in space at the same time, and interference is reduced. To be specific, communication can be performed on different D2D links in a BSS at the same time.

In the related art, only a method for spatial reuse and interference canceling in a BSS is considered, and interference from the outside of the BSS is not considered, in other words, communication in another BSS may affect communication in an SP in the local BSS, causing communication conflicts.

SUMMARY

This application provides a spatial reuse method and apparatus, to implement spatial reuse of SPs between BSSs.

According to a first aspect, a spatial reuse method is provided. A first node in a first basic service set BSS1 receives a measurement request sent by a second node in a second basic service set BSS2, where one or more first service periods SP1 are allocated in the BSS1, one or more second service periods SP2 are allocated in the BSS2, and the measurement request is used to request to measure the one or more second service periods SP2. The first node in the BSS1 receives a measurement report of the second node in the BSS2, where the measurement report is a report of measuring the one or more first service periods SP1. The first node in the BSS1 determines, based on the received measurement report, whether to allow spatial reuse of the one or more first service periods SP1 and the one or more second service periods SP2.

According to a second aspect, a spatial reuse method is provided. A second node in a second basic service set BSS2 sends a measurement request to a first node in a first basic service set BSS1, where one or more first service periods SP1 are allocated in the BSS1, one or more second service periods SP2 are allocated in the BSS2, and the measurement request is used to request to measure the one or more second service periods SP2. The second node in the BSS2 sends a measurement report to the first node in the BSS1, where the measurement report is a report of measuring the one or more first service periods SP1, and the measurement report is used to determine whether to allow spatial reuse of the one or more first service periods SP1 and the one or more second service periods SP2.

According to a third aspect, a spatial reuse method is provided. A first node in a first basic service set BSS1 receives a spatial reuse request sent by a second node in a second basic service set BSS2, where one or more first service periods SP1 are allocated in the BSS1, one or more second service periods SP2 are allocated in the BSS2, the spatial reuse request includes information about the one or more second service periods SP2 and/or information about the one or more first service periods SP1, the information about the SP2 includes spatial reuse status information of the SP2, and spatial reuse status information of an SP is used to indicate a spatial reuse status of the SP. The first node in the BSS1 determines, based on a spatial reuse status of the SP1 and the received spatial reuse status information of the SP2, whether to allow spatial reuse of the one or more second service periods SP2 and the one or more first service periods SP1.

According to a fourth aspect, a spatial reuse method is provided. A second node in a second basic service set BSS2 sends a spatial reuse request to a first node in a first basic service set BSS1, where one or more first service periods SP1 are allocated in the BSS1, one or more second service periods SP2 are allocated in the BSS2, the spatial reuse request includes information about the one or more second service periods SP2 and/or information about the one or more first service periods SP1, the information about the SP2 includes spatial reuse status information of the SP2, spatial reuse status information of an SP is used to indicate a spatial reuse status of the SP, and the spatial reuse request is used to request to perform spatial reuse of the one or more first service periods SP1 and the one or more second service periods SP2.

According to a fifth aspect, a spatial reuse apparatus is provided, and includes a processing module and a transceiver module. The apparatus is located in a first basic service set BSS1. The transceiver module is configured to receive a measurement request sent by a second node in a second basic service set BSS2, where one or more first service periods SP1 are allocated in the BSS1, one or more second service periods SP2 are allocated in the BSS2, and the measurement request is used to request to measure the one or more second service periods SP2; and receive a measurement report of the second node in the BSS2, where the measurement report is a report of measuring the one or more first service periods SP1. The processing module is configured to determine, based on the received measurement report, whether to allow spatial reuse of the one or more first service periods SP1 and the one or more second service periods SP2.

According to a sixth aspect, a spatial reuse apparatus is provided, and includes a processing module and a transceiver module. The apparatus is located in a second basic service set BSS2. The transceiver module is configured to send a measurement request to a first node in a first basic service set BSS1, where one or more first service periods SP1 are allocated in the BSS1, one or more second service periods SP2 are allocated in the BSS2, and the measurement request is used to request to measure the one or more second service periods SP2; and send a measurement report to the first node in the BSS1, where the measurement report is a report of measuring the one or more first service periods SP1, and the measurement report is used to determine whether to allow spatial reuse of the one or more first service periods SP1 and the one or more second service periods SP2.

According to a seventh aspect, a spatial reuse apparatus is provided, and includes a processing module and a transceiver module. The apparatus is located in a first basic service set BSS1. The transceiver module is configured to receive a spatial reuse request sent by a second node in a second basic service set BSS2, where one or more first service periods SP1 are allocated in the BSS1, one or more second service periods SP2 are allocated in the BSS2, the spatial reuse request includes information about the one or more second service periods SP2 and/or information about the one or more first service periods SP1, the information about the SP2 includes spatial reuse status information of the SP2, and spatial reuse status information of an SP is used to indicate a spatial reuse status of the SP. The processing module is configured to determine, based on a spatial reuse status of the SP1 and the received spatial reuse status information of the SP2, whether to allow spatial reuse of the one or more second service periods SP2 and the one or more first service periods SP1.

According to an eighth aspect, a spatial reuse apparatus is provided, and includes a processing module and a transceiver module. The apparatus is located in a second basic service set BSS2. The transceiver module sends a spatial reuse request to a first node in a first basic service set BSS1, where one or more first service periods SP1 are allocated in the BSS1, one or more second service periods SP2 are allocated in the BSS2, the spatial reuse request includes information about the one or more second service periods SP2 and/or information about the one or more first service periods SP1, the information about the SP2 includes spatial reuse status information of the SP2, spatial reuse status information of an SP is used to indicate a spatial reuse status of the SP, and the spatial reuse request is used to request to perform spatial reuse of the one or more first service periods SP1 and the one or more second service periods SP2.

According to a ninth aspect, a computer storage medium is provided. The computer storage medium stores program code. The program code may be used to instruct to perform the methods in the first aspect to the fourth aspect or any optional implementation thereof.

BRIEF DESCRIPTION OF DRAWINGS

To describe technical solutions in embodiments of the present invention more clearly, the following briefly describes accompanying drawings required for describing the embodiments or the related art. Clearly, the accompanying drawings in the following descriptions show merely some embodiments of the present invention, and a person of ordinary skill in the art may derive other drawings from these accompanying drawings without creative efforts.

FIG. 12A to FIG. 12C are a schematic diagram of information bits of spatial reuse status information according to an embodiment of this application;

DESCRIPTION OF EMBODIMENTS

The following clearly describes technical solutions in embodiments of the present invention with reference to accompanying drawings in the embodiments of the present invention. Clearly, the described embodiments are some but not all of the embodiments of the present invention. All other embodiments obtained by a person of ordinary skill in the art based on the embodiments of the present invention without creative efforts shall fall within the protection scope of the present invention.

To better conform to a reading habit of a person skilled in the art, in the accompanying drawings of this specification, some schematic diagrams are described in English, and are accordingly explained in specific implementations of this specification.

A spatial reuse method and apparatus that are provided in the embodiments of this application may be applicable to a WLAN system, for example, WLAN systems of the 802.11ad standard, the 802.11ay standard, and subsequently improved standards of the standards, or may be applied to a cellular network. A WLAN is used as an example, and the network device may be an AP.

Figure 1:
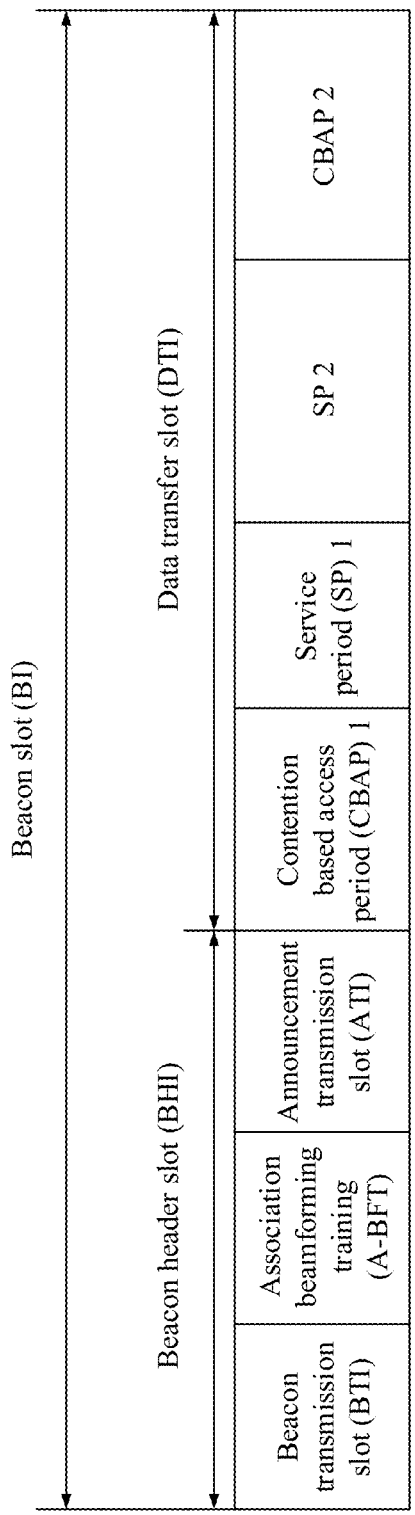
FIG. 1 is an interval diagram of a BI in 802.11ad/ay.
Figure 2:
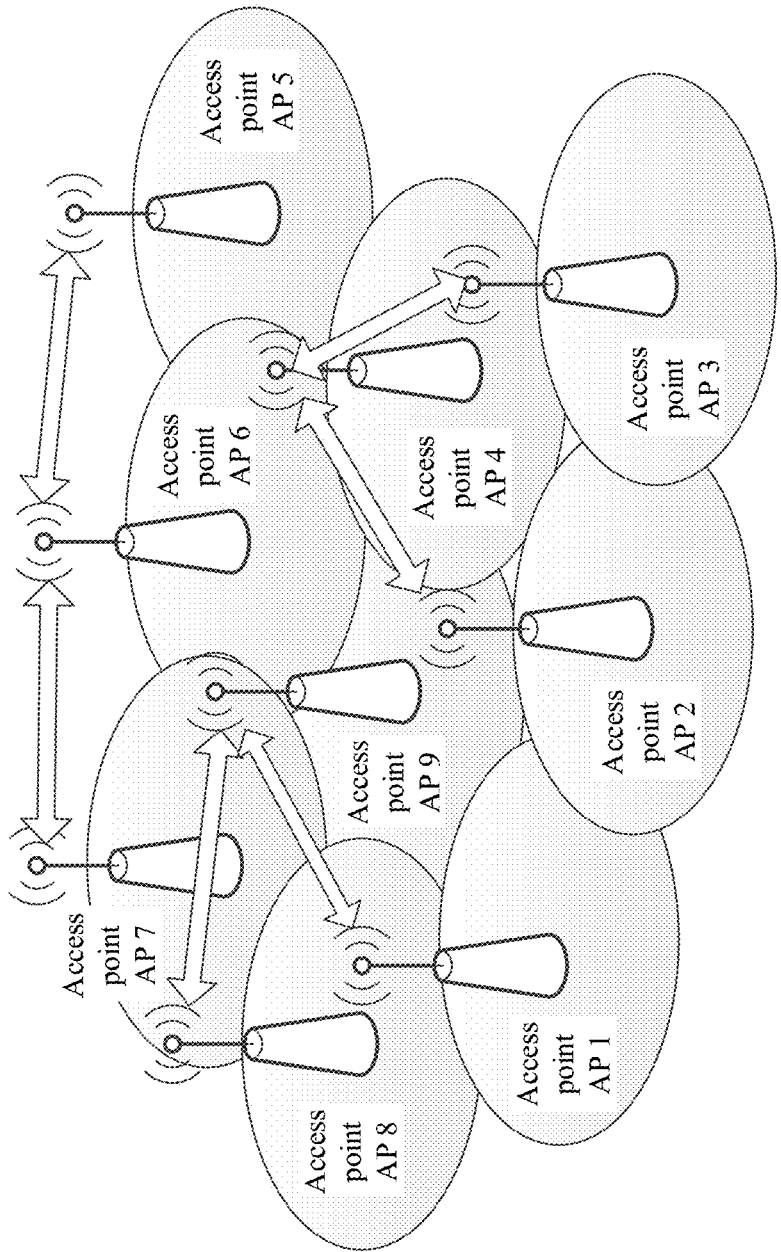
FIG. 2 is a schematic structural diagram of a system according to an embodiment of this application.

FIG. 2 is an example of a schematic structural diagram of a network system to which the embodiments of this application are applicable. In FIG. 2, there are a plurality of APs, the APs are in wireless connection, and a communication coverage range of an AP may be a BSS, represented by using a circle in the figure. Because the APs are deployed relatively densely, coverage areas of adjacent BSSs overlap. To implement coordination between BSSs, an AP and an adjacent AP may implement beamforming training, to set up a directional beam link, and an interval may be scheduled for APs to communicate with each other, to exchange some information frames.

Figure 3:
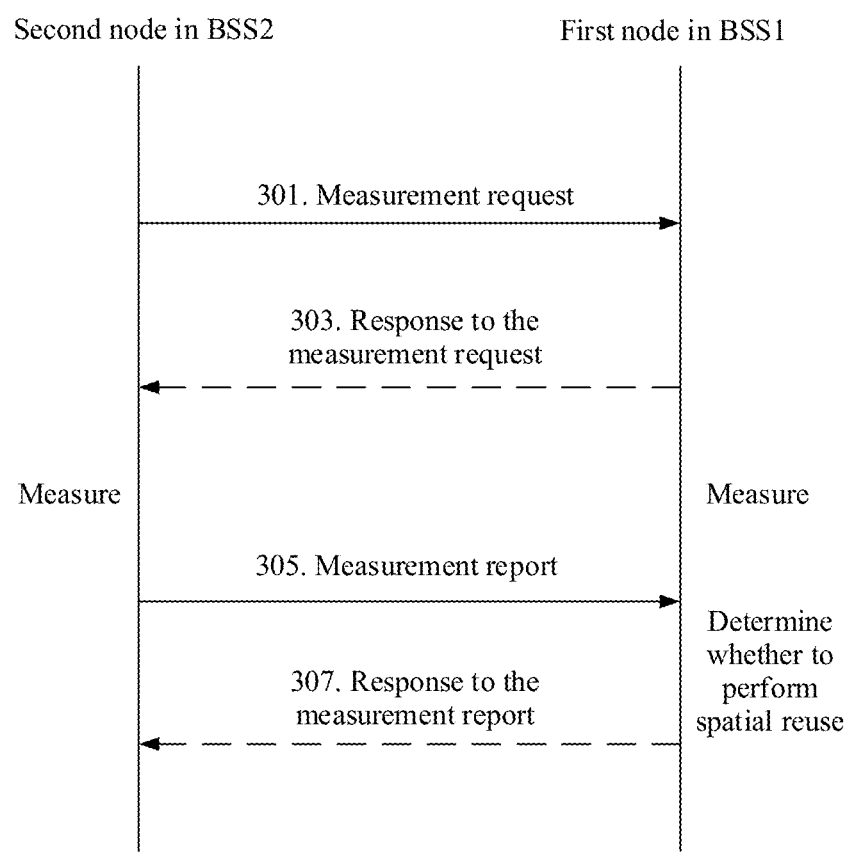
FIG. 3 is a schematic flowchart of a method according to an embodiment of this application.

FIG. 3 is a schematic flowchart of a method according to an embodiment of this application. The method includes the following processing process.

301: A second node in a second basic service set (which may be marked as BSS2, where the other terms are described based on a similar rule) sends a measurement request. Further, one or more second service periods SP2 (Chinese full name of an SP: service period, English full name: service period) are allocated in the BSS2. Further, the second node sends the measurement request to a first node in a first basic service set BSS1, and one or more first service periods SP1 are allocated in the BSS1. Correspondingly, the first node in the BSS1 receives the measurement request. Further, the measurement request is used to request to measure the one or more second service periods SP2, and the measurement may be measurement used for spatial reuse, for example, channel measurement.

A first SP may be an SP that has been scheduled, and may be referred to as an existing SP, or may be referred to as another name. A second SP may be an SP that is used for spatial reuse assessment together with the SP that has been scheduled, or an SP that can be re-scheduled, or an SP that may be considered to be re-allocated in a beacon interval (English full name: beacon interval, and English acronym: BI).

The one or more first service periods SP1 may have same duration, or may have different duration. The first service periods SP1 are not limited to being the same. Same understanding is applicable to the one or more second service periods SP2.

The first node is an access point AP or a station STA, and the second node is an AP or a STA.

The measurement request may include one or more pieces of the following information:

Information about an SP: The information may be used to represent information about an SP, for example, includes a start time indication or an offset time indication of the SP. Optionally, the information about an SP includes information about the one or more second service periods SP2 and/or information about the one or more first service periods SP1.

Time information of measurement: The time information is used to represent time information of measurement, for example, includes a start time of measurement and an end time of measurement.

Measurement manner: The measurement manner is used to represent information about a manner of measuring an SP, for example, may include information about a channel to be measured, a channel measurement manner, or an antenna measurement manner.

303: The first node in the BS Si sends a response to the measurement request, where the response to the measurement request is a response to the measurement request. Further, the first node sends the response to the measurement request to the second node in the BSS2. Correspondingly, the second node in the BSS2 receives the measurement request. The processing is optional.

The response to the measurement request may include one or more pieces of the following information:

Indication of accepting or rejecting the measurement request: The indication is used to indicate whether to accept or reject the measurement request.

Indication information of a subsequent beacon interval BI: The indication information is used to represent information about one or more subsequent BIs.

The one or more second service periods SP2 and/or the one or more first service periods SP1 are separately measured. Further, channel measurement may be performed. For example, the first node in the BSS1 and/or another node that is scheduled by the first node in the BSS1 and that is in the BSS1 measure the one or more second service periods SP2, and it may be understood as measuring the one or more second service periods SP2, or may be understood as measuring one or more candidate SPs. The second node in the BSS2 and/or another node that is scheduled by the second node in the BSS2 and that is in the BSS2 measure the one or more first service periods SP1, and it may be understood as measuring the one or more first service periods SP1, or may be understood as measuring one or more existing SPs.

305: The second node in the BSS2 sends a measurement report. Further the measurement report is a report of measuring the one or more first service periods SP1. Further, the second node sends the measurement report to the first node in the BSS1. Correspondingly, the first node in the BSS1 receives the measurement report.

The measurement report may include one or more pieces of the following information:

Information about a measured channel: The information is used to represent information about a measured channel, for example, indicates a channel on which measurement is performed.

Duration of measurement: The duration is used to indicate duration of measurement.

Content of the measurement report: The content is used to represent content of the measurement report. For example, the content of the measurement report may be described by using an RSSI (Chinese full name: received signal strength indication, English full name: received signal strength indication), or by using an ANIPI (Chinese full name: average noise plus interference power indicator, English full name: average noise plus interference power indicator), or by using an RSNI (Chinese full name: received signal-to-noise indicator, English full name: received signal-to-noise indicator).

Further, the first node in the BSS1 determines, based on the received measurement report, whether to allow spatial reuse of the one or more second service periods SP2 and the one or more first service periods SP1. Further, the first node in the BSS1 determines, based on the received measurement report and a result of measuring the one or more second service periods SP2, whether to allow spatial reuse of the one or more first service periods SP1 and the one or more second service periods SP2. Further, certainly, the first node in the BSS1 may perform determining based on an existing technology in 802.16. The processing is not the focus of discussion in the embodiments of this application, and details are not described herein.

307: The first node in the BSS1 sends a response to the measurement report, where the response to the measurement report is a response to the measurement report. Further, the first node sends the response to the measurement report to the second node in the BSS2. Correspondingly, the second node in the BSS2 receives the response to the measurement report. The processing is optional.

Further, the response to the measurement report may include one or more pieces of the following information:

Indication used to indicate whether to allow spatial reuse of an SP object: The indication is used to represent an indication used to indicate whether to allow spatial reuse of an SP object.

Power control information: The power control information is used to represent information about power control. For example, the first node in the BSS1 sends the response to the measurement report to the second node in the BSS2, and the response to the measurement report carries the information, to notify the second node in the BSS2 that a power is reduced or increased to a particular value and spatial reuse (SR) of an SP is allowed or rejected.

In the embodiment shown in FIG. 3, measurement of SPs between BSSs can be implemented by using a communications link between the BSSs, so that SR of the SPs between the BSSs can be implemented, the SPs do not need to be staggered to reduce interference, spatial and temporal resources can be better used, and a system throughput can be improved.

In this embodiment of this application, a technology for a node in a BSS to schedule another node in the BSS to perform measurement or for a node in a BSS to perform measurement itself may draw a lesson from an existing measurement method in the IEEE 802.11ad. In the IEEE 802.11ad, there are mainly two measurement technologies as follows:

In an ANIPI-based manner, a node measures an average noise plus interference power on a channel. In this measurement manner, a STA cannot send a frame, and no frame is sent to the STA either.

In an RSNI-based manner, a node measures a received signal-to-noise ratio on a channel.

Generally, the first manner, namely, the ANIPI-based manner, is mainly used.

To better implement the embodiment of FIG. 2, the following further describes concepts.

First, information, namely, a spatial reuse indication, is introduced, and the information is optional.

To implement SR of an SP, a spatial reuse indication (which may be briefly referred to as an SR indication) may be carried in scheduling information sent in a BI. The SR indication is used to indicate whether the SP supports SR between BSSs, and the indication may be in a form of a bit indicator. In some scenarios, being between BSSs may be briefly described as, but not limited to, being between APs.

Figure 4A:
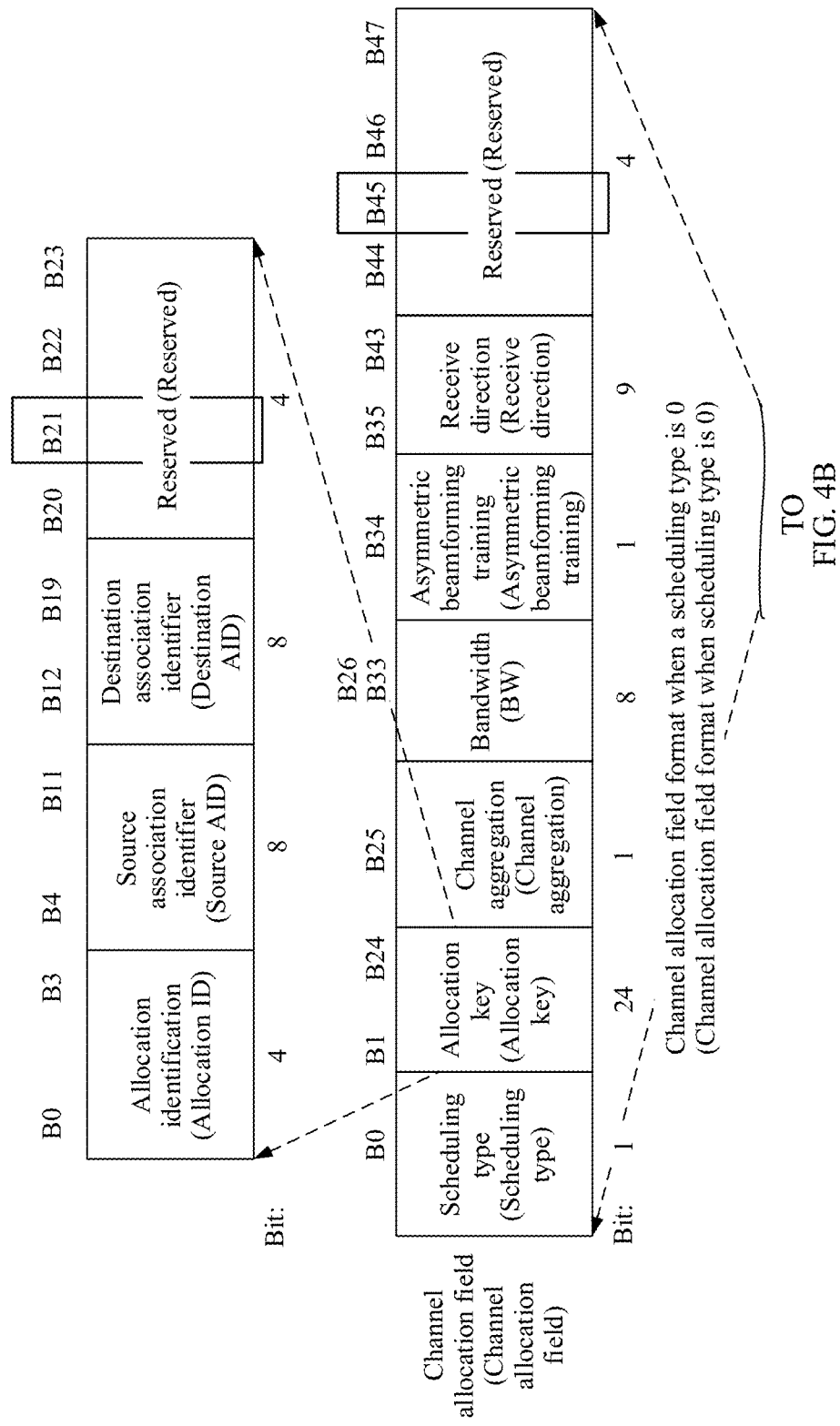
FIG. 4A to FIG. 4C are a schematic diagram of information bits of a spatial reuse indication according to an embodiment of this application.
Figure 4B:
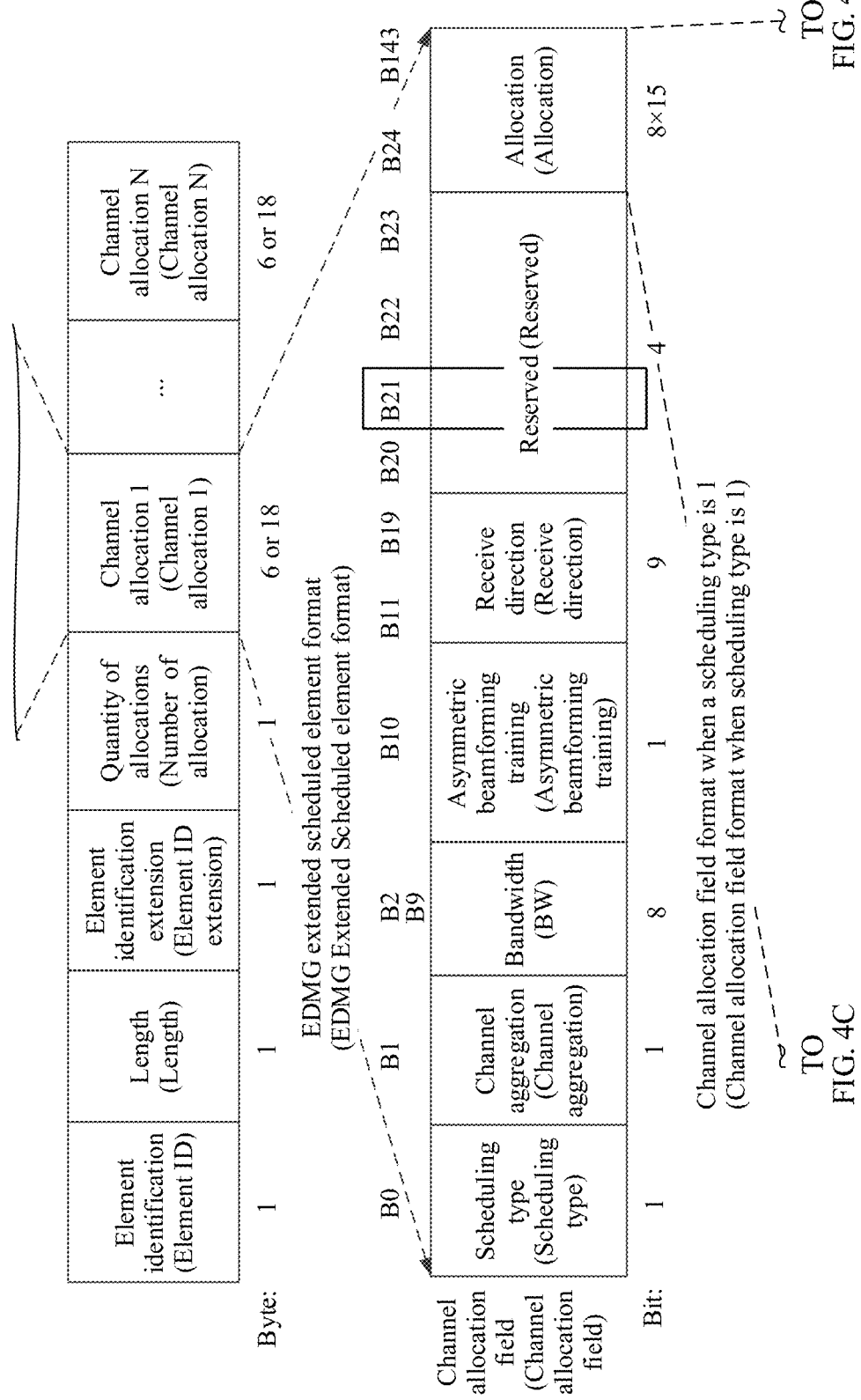
Figure 4C:
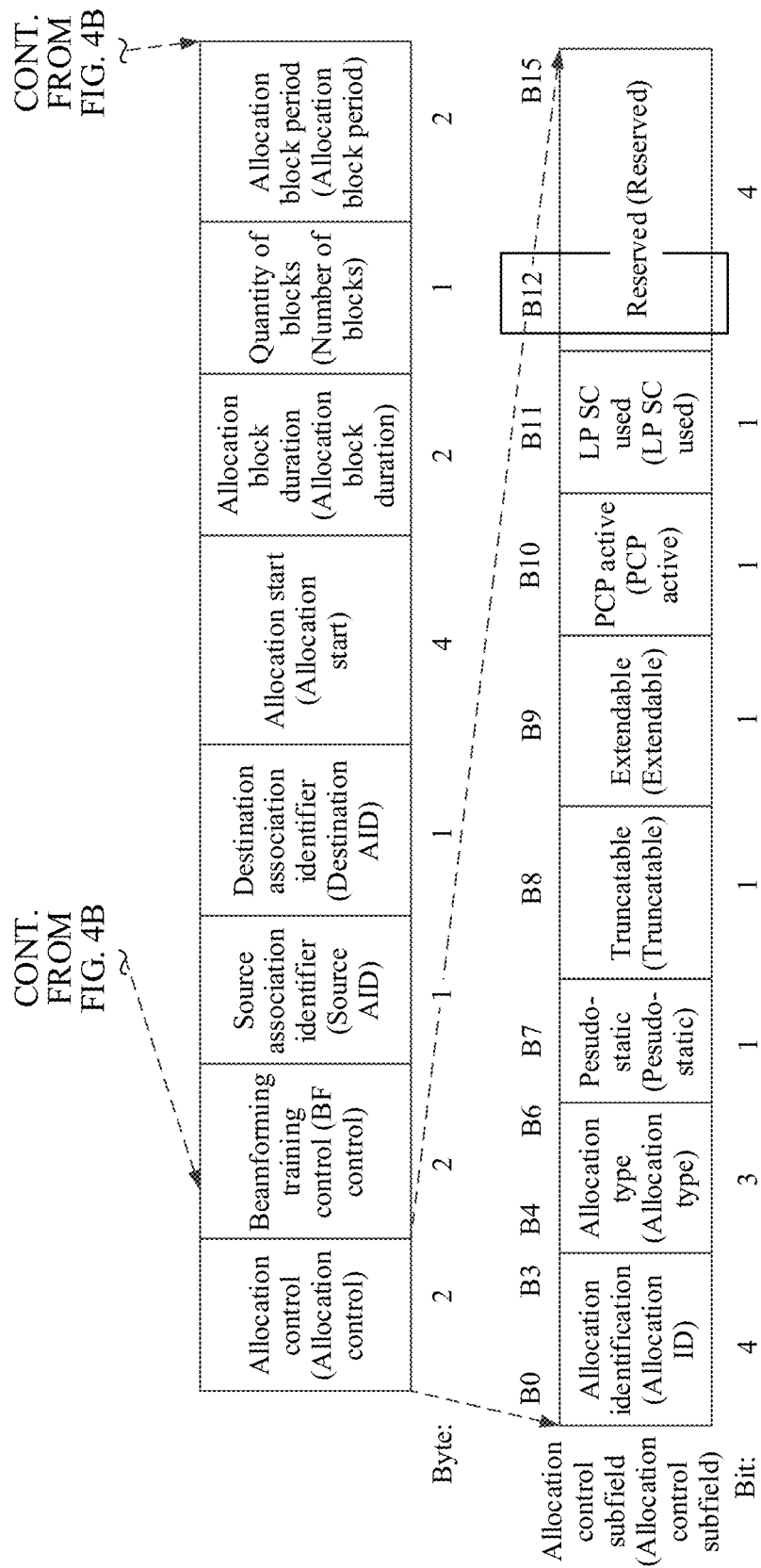

A location of an interval in which the SR indication is sent, for example, may be located in a BTI, a CBAP (Chinese full name: contention based access period, English full name: Contention Based Access Period), A-BFT (Chinese full name:

A location of an interval in which the SR indication is sent, for example, may be located in a BTI, a CBAP (Chinese full name: contention based access period, English full name: Contention Based Access Period), A-BFT (Chinese full name: association beamforming training, English full name: Association Beamforming Training), or an SP. The SR indication may be carried in a beacon, and may be specifically carried in an extended schedule element in the beacon, or may be carried in other information. An English name of the extended schedule information may be an extended schedule element (which may be briefly referred to as ESE for the convenience of description). As shown in FIG. 4A to FIG. 4C, EDMG (Extended Directional Multi-Gigabit) is used as an example, and a description that an indicator may be carried in one or more following red bit locations by way of example. A node, for example, a neighboring AP, in another BSS can learn about, by using the indication, whether an SP supports SR of SPs between BSSs, to arrange a measurement and feedback process. With reference to the foregoing embodiment, the first node in the BSS1 sends a spatial reuse indication, where the spatial reuse indication is used to indicate whether an SP supports SR between BSSs. The second node in the BSS2 receives the spatial reuse indication sent by the first node in the BSS1, and learns about an SP that is scheduled by the first node in the BSS1 and on which spatial reuse can be performed. It may be further understood that the second node in the BSS2 learns about information about one or more first service periods SP1 scheduled by the first node in the BSS1.

Second, a dynamic ATI and scheduling information of the dynamic ATI are introduced. These may also be optional.

To implement SR of SPs between BSSs in one BI, one or more dynamic ATIs (dynamic ATI in English) may be included in a DTI of the BI. The dynamic ATI may be understood as an ATI that can be set, and may also be understood as a scheduling interval that is set in the DTI based on a scheduling requirement. Optionally, the dynamic ATI may be set based on a particular time interval. A function of the scheduling interval may be the same as a function of an ATI in an existing standard. The ATI is set flexibly, so that one BI period may include more than one ATI, to increase an opportunity of performing scheduling in the BI. Further, in a specific implementation, the dynamic ATI may be implemented by setting SP information. For example, source AID in SP allocation is an AID of an AP, and destination AID is a broadcast AID. In this way, the SP information becomes scheduling information and becomes a dynamic ATI. Actually, from the terms of a technical design, if a dynamic ATI is implemented by using an SP, the SP acting as the dynamic ATI may be considered as a special SP interval. If a source AID of an SP is set to an AID of an AP, and a destination AID is set to a broadcast AID, all STAs need to be in a receiving state in the SP, to receive transmission from the AP. Therefore, the AP can re-arrange interval resource scheduling in the time period. Further, the dynamic ATI may be set in the DTI based on a fixed time interval. Further, in a system, dynamic ATIs of different APs do not overlap in time.

A technical advantage of the dynamic ATI is as follows: Compared with the existing 802.11ad standard, there is only one opportunity of arranging DTI scheduling in one BI, and scheduling may be implemented in a BTI or an ATI. According to the dynamic ATI, a node and a resource can be re-scheduled in the DTI, and flexible information exchange between BSSs can be implemented. In addition, in the DTI, scheduling of an AP is performed based on information reported by a STA or request information of another AP. Therefore, the AP already learns how to arrange scheduling.

Therefore, in the dynamic ATI, the AP does not need to ask STAs in turn as in the ATI, and the AP only needs to send one notification frame (which may include an ESE) to each STA, to reduce overheads.

Figure 5:
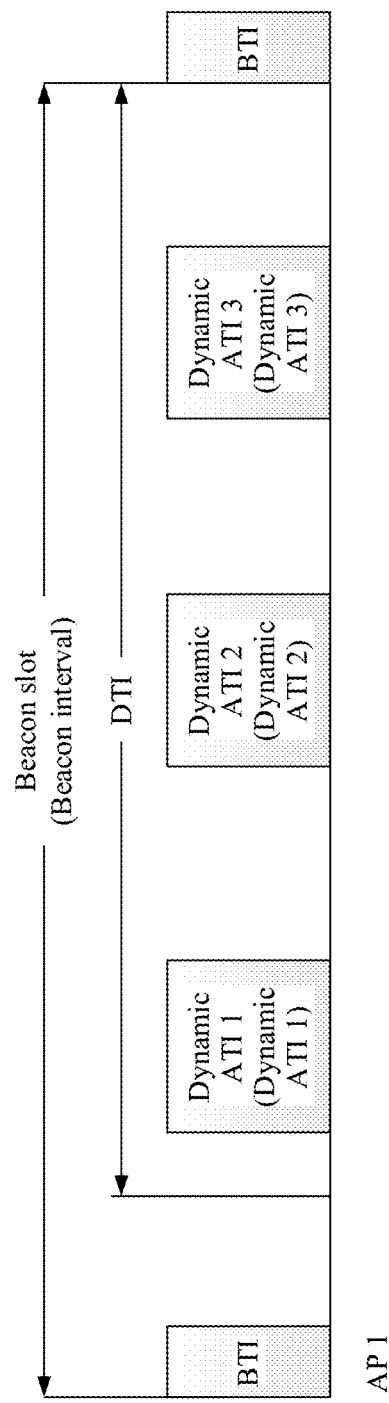
FIG. 5 is a schematic interval diagram of a dynamic ATI according to an embodiment of this application.

FIG. 5 shows an example of a frame structure of a dynamic ATI.

Certainly, for the dynamic ATI (dynamic ATI), there may also be scheduling information of the dynamic ATI, and the scheduling information of the dynamic ATI is used to indicate scheduling information about the dynamic ATI. The scheduling information of the dynamic ATI may be carried in a beacon (for example, an ESE of the beacon) to be notified to a node in another BSS. For example, the first node in the BSS1 notifies the second node in the BSS2 of the scheduling information of the dynamic ATI by using a beacon frame. With reference to the foregoing embodiment, the first node in the BSS1 sends the scheduling information of the dynamic ATI, the second node in the BSS2 receives the scheduling information of the dynamic ATI sent by the first node in the BSS1, the first node in the BSS1 may implement channel measurement and related signaling exchange for SPs between BSSs by using the dynamic ATI, so that SP sharing is completed in one BI. The second node in the BSS2 may exchange some signaling with the first node in the BSS1 in a plurality of dynamic ATIs, and the first node in the BSS1 may further schedule time to communicate with the second node in the BSS2.

Figure 6:
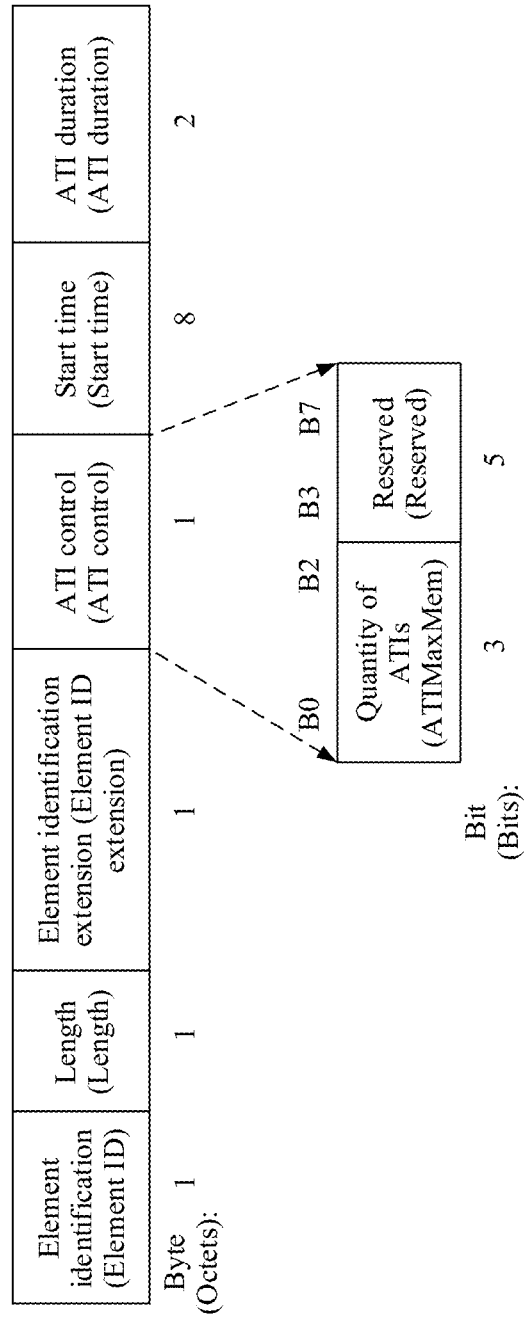
FIG. 6 is a schematic diagram of a frame structure of a dynamic ATI according to an embodiment of this application.

The dynamic ATI may alternatively have another name, and the scheduling information of the dynamic ATI, for example, may be sent in a beacon transmission interval BTI, A-BFT, a CBAP, or an SP. The scheduling information of the dynamic ATI, for example, may be carried in extended schedule information or a beacon. The scheduling information of the dynamic ATI, for example, may include one or more pieces of the following information, as shown in FIG. 6:

Start time: The start time, for example, is represented as start time in the figure, and is used to indicate a start time of a first ATI in the dynamic ATI.

Duration of an ATI: The duration of an ATI, for example, is represented as ATI duration in the figure, and is used to indicate duration of an ATI in the dynamic ATI.

Quantity of ATIs: The quantity of ATIs, for example, is represented as ATIMaxMem in the figure, and is used to represent a quantity of ATIs in a DTI. The quantity of ATIs may be placed in an ATI control field (which, for example, is represented as ATI control field in the figure).

For content of the other part in FIG. 6, refer to the introduction and the stipulation of an existing technical standard such as 802.11ad.

According to the scheduling information of the dynamic ATI, re-scheduling of a node and time can be implemented in a DTI, interference between BSSs can be processed more flexibly, and interaction between the BSSs can be arranged flexibly.

Figure 7:
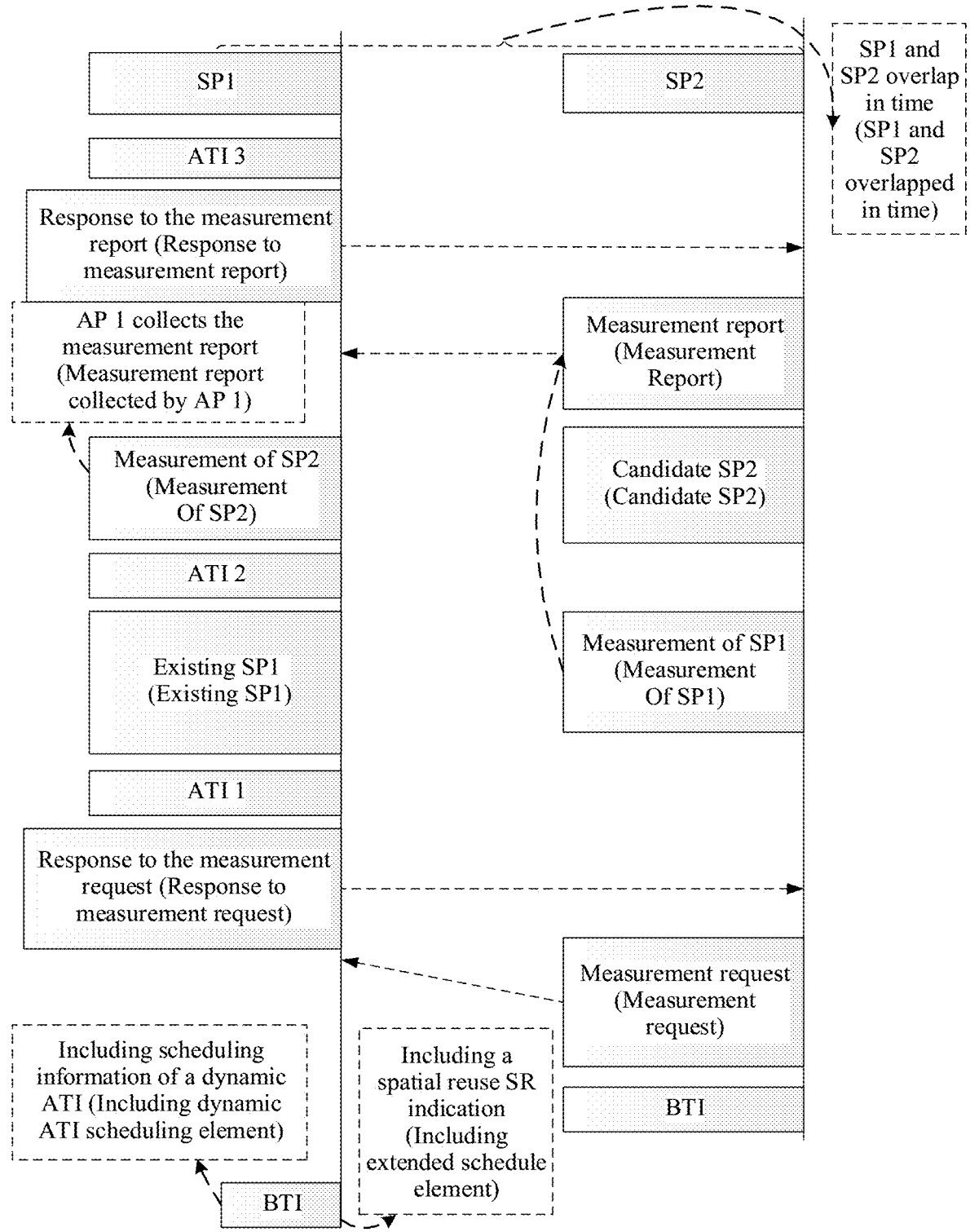
FIG. 7 is a schematic diagram of an interval process according to an embodiment of this application.

For how to implement SR of SPs between BSSs in FIG. 2, the following describes, with reference to FIG. 7, an implementation of SR of SPs in one BI.

The second node in the BSS2 is a node sending a measurement request (measurement request in English). Before the second node in the BSS2 sends the measurement request to the first node in the BSS1, the second node in the BSS2 and the first node in the BSS1 may have completed beamforming training, and the second node in the BSS2 and the first node in the BSS1 may have a communication interval.

Before sending the measurement request, the second node in the BSS2 may have learned about information about a BTI of the first node in the BSS1, and learned about a spatial reuse SR indication (including extended schedule element in the figure) or scheduling information of a dynamic ATI (including dynamic ATI scheduling element in the figure) from the BTI.

After receiving the SR indication, the second node in the BSS2 may learn about information about an SP on which SR can be performed and that is of the first node in the BSS1, for example, information about SP1 in FIG. 7. The SP on which SR can be performed may be referred to as one or more first service periods SP1, and for example, is existing SP1 in FIG. 7.

The second node in the BSS2 sends the measurement request (measurement request in FIG. 7) to the first node in the BSS1, where the measurement request is used to request measurement used for spatial reuse and/or interference reducing. Further, the measurement request may be sent in a CBAP/SP allocated by the first node of the BSS1, to request the first node in the BSS1 and/or another node that is scheduled by the first node in the BSS1 and that is in the BSS1 to perform channel measurement when data is transmitted in one or more second service periods SP2. The measurement request sent by the second node in the BSS2 to the first node in the BSS1 may include information about an SP, for example, may include information about an SP that is scheduled by the first node in the BSS1 and in which SR is expected, for example, the SP1 in FIG. 7, and may further include information about an SP that is scheduled by the second node in the BSS2 and in which SR is expected, for example, SP2 in FIG. 7.

The first node in the BSS1 receives the measurement request sent by the second node in the BSS2, and optionally, the first node sends the response to the measurement request, to indicate that the measurement request is accepted or rejected. The response to the measurement request is response to measurement request in FIG. 7.

Further, the measurement request and the response to the measurement request may be completed before a dynamic ATI (for example, ATI 2) that is of the second node in the BSS2 and that is closest to a candidate SP2.

The second node in the BSS2 and/or another node that is scheduled by the second node in the BSS2 and that is in the BSS2 perform channel measurement (measurement of SP1 in the figure) when data is transmitted in the one or more first service periods SP1. The first node in the BSS1 and/or another node that is scheduled by the first node in the BSS1 and that is in the BSS1 perform channel measurement (measurement of SP2 in the figure) when data is transmitted in the one or more second service periods SP2. The first node in the BSS1 may obtain a result of channel measurement performed when data is transmitted in the one or more second service periods SP2, and the result is measurement report collected by BSS1 in the figure. During implementation, specific measurement may be implemented as a measurement process in 802.11ad, for example, a directional channel quality request and/or directional channel quality report in the standard.

The second node in the BSS2 sends a result of measuring the SP1 by the second node itself and/or one or more scheduled STA to the first node in the BSS1 in a form of the measurement report measurement report.

The first node in the BSS1 determines, based on the received measurement report and/or a result of measuring the one or more second service periods SP2 by the first node in the BSS1 and/or the another node that is scheduled by the first node in the BSS1 and that is in the BSS1, whether spatial reuse can be performed on the one or more first service periods SP1 and the one or more second service periods SP2. The first node in the BSS1 may send a determining result to the second node in the BSS2. As shown in the figure, the first node in the BSS1 sends the response to the measurement report to the second node in the BSS2. The response to the measurement report is a response to the measurement report. The response to the measurement report may include an indication used to indicate whether to allow spatial reuse of the one or more second service periods SP2 and the one or more first service periods SP1. For example, the first node in the BSS1 sends the response to the measurement report, to indicate that spatial reuse is allowed to be performed on the SP2 and the SP1.

Spatial reuse of the one or more first service periods SP1 and the one or more second service periods SP2 may be performed in a current BI or a next BI, for example, a box, SP1 and SP2 overlapped in time, in the figure.

Figure 8:
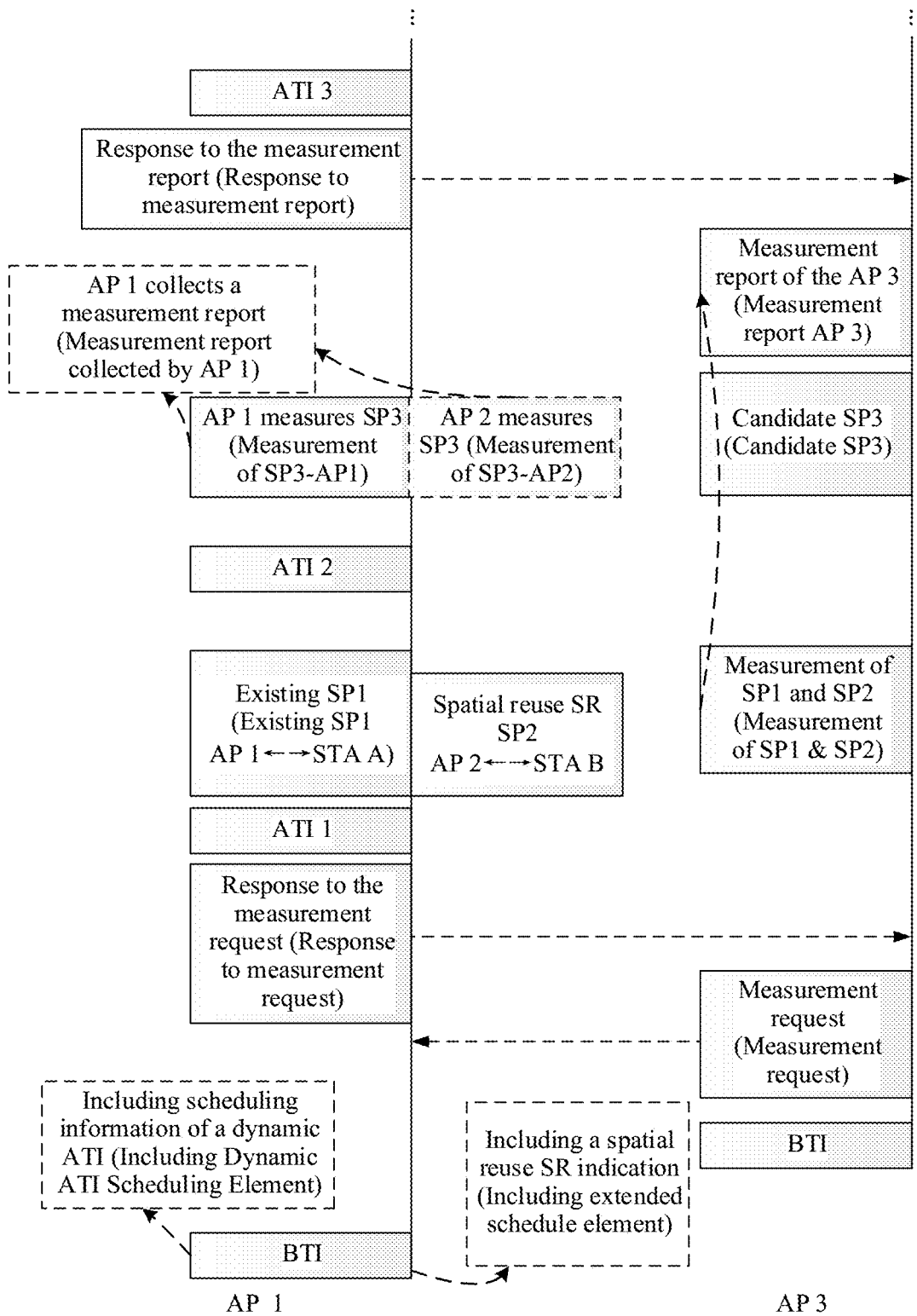
FIG. 8 is a schematic diagram of an interval process according to another embodiment of this application.

The foregoing describes SR of SPs between two BSSs. If SR of SPs between at least three BSSs are involved, refer to the foregoing embodiment. With reference to FIG. 8, the following briefly describes SR of SPs between three BSSs by way of example.

If SR has been performed on the one or more first service periods SP1 of the first node in the BSS1 and the one or more second service periods SP2 of the second node in the BSS2, SR with the SP1/SP2 may be expected in one or more candidate SPs (for example, one or more SP3 of a third node in BSS3) in another BSS.

The first node in the BSS1 receives a measurement request, and needs to determine, based on information about the SP3 in the request, whether there is a time for interacting with the second node in the BSS2 before the SP3 and whether the first node in the BSS1 and the second node in the BSS2 can re-arrange and schedule measurement for the SP3, where interaction aims to notify the second node in the BSS2 of the measurement request sent by the third node in the BSS3. It is assumed that the first node in the BSS1 and the second node in the BSS1 know a dynamic ATI time of a peer end.

If the first node in the BSS1 can notify the second node in the BSS2 of the measurement request, and both the first node in the BSS1 and the second node in the BSS2 can re-arrange and schedule measurement for the SP3 before a start of the candidate SP3 (one dynamic ATI), the first node in the BSS1 may allow the measurement request.

If the first node in the BSS1 cannot notify the second node in the BSS2 of the measurement request of the candidate SP3, and/or neither the first node in the BSS1 nor the second node in the BSS2 can re-arrange or schedule measurement for the SP3 before a start of the candidate SP3, the first node in the BSS1 may allow the measurement request but the foregoing related operation is to be performed in a next BI, or the first node may reject the measurement request.

The first node in the BSS1 needs to collect information about a result of measuring the SP3 in the BSS2 and a measurement report sent by the third node in the BSS3, and a sending time of the measurement report may be scheduled by the first node in the BSS1.

The embodiment of FIG. 2 may also implement sharing between SPs in at least two BIs.

Because a general node such as an AP has only one scheduling opportunity in one BI, scheduling is performed once every two BIs, and a measurement request, a measurement response, measurement, a measurement report, and a response to the measurement report are implemented by using a plurality of BIs, to implement SR between BSSs. Exchange of signaling such as the measurement request and the response to the measurement request between the first node in the BSS1 and the second node in the BSS2 may be alternatively implemented by using a beacon frame in a plurality of BIs (the signaling such as the measurement request and the response to the measurement request may be implemented by using a designed element, and the element may be carried in a beacon).

Figure 9:
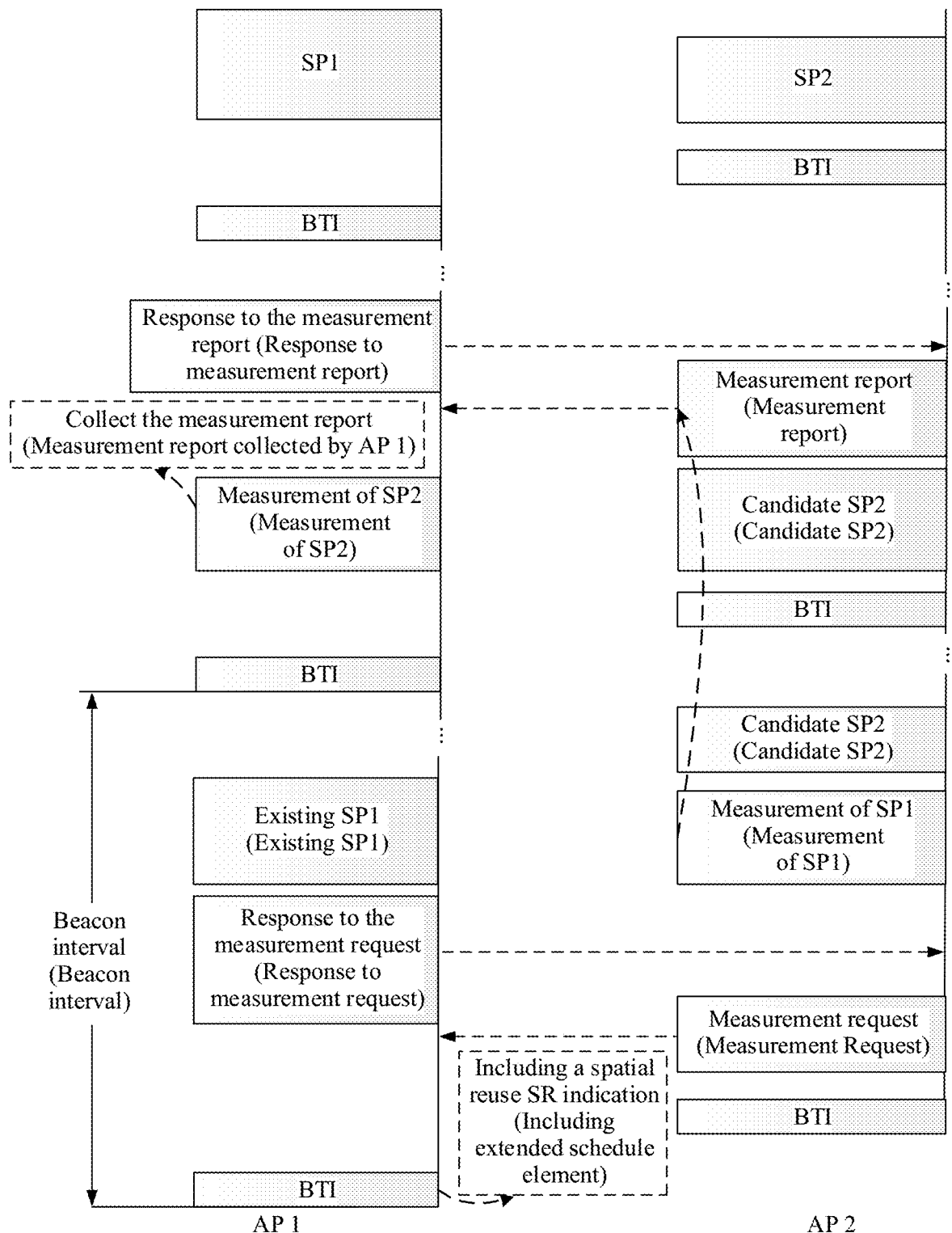
FIG. 9 is a schematic diagram of an interval process according to another embodiment of this application.

The following provides a brief description by way of example with reference to FIG. 9. For a part that is not described, refer to explanations in other embodiments.

The second node in the BSS2 sends a measurement request. Optionally, after receiving an SR indication of the first node in the BSS1, where the SR indication may be specifically an indicator included in an extended schedule element, the second node in the BSS2 sends the measurement request to the first node in the BSS1 by using a CBAP (which may be an SP, A-BFT, or an ATI) allocated by the first node in the BSS1. The measurement request may include information about an SP, for example, may include information about an SP that is in the BSS1 and in which SR is expected, for example, SP1 in the figure, or may include information about an SP that is in the BSS2 and in which SR is expected, for example, SP2 in the figure. Certainly, the first node in the BSS1 and the second node in the BSS2 may have completed beamforming training, and the first node in the BSS1 and the second node in the BSS2 have a communication interval.

After the first node in the BSS1 receives the measurement request of the second node in the BSS2, and may reply with a response to the measurement request, the first node does not perform an operation in the BI. In a scheduled time of a next BI, the first node in the BSS1 and/or another node that is scheduled by the first node in the BSS1 and that is in the BSS1 measure the one or more second service periods SP2, schedule a time for the second node in the BSS2 to send a measurement report, and send a response to the measurement report.

If SR may be performed on the SP1 of the first node in the BSS1 and the SP2 of the second node in the BSS2, the response to the measurement report allows the SR in the second node in the BSS2. In a third BI, the SP1 and the SP2 can partially or completely overlap in time, to implement spatial reuse.

For a solution of implementing SR of SPs between at least three BSSs in at least two BIs, refer to the embodiments of FIG. 8 and FIG. 9. Measurement can be implemented still by using a solution for at least two BIs, and only steps of measurement request notification and measurement result collection between BSSs for which SR has been performed are added. More BSSs participating in spatial reuse indicates that more time is consumed in an overall measurement process.

The present invention further provides a spatial reuse method. The method may be used independently, or may be used in combination with the foregoing embodiment.

Figure 10:
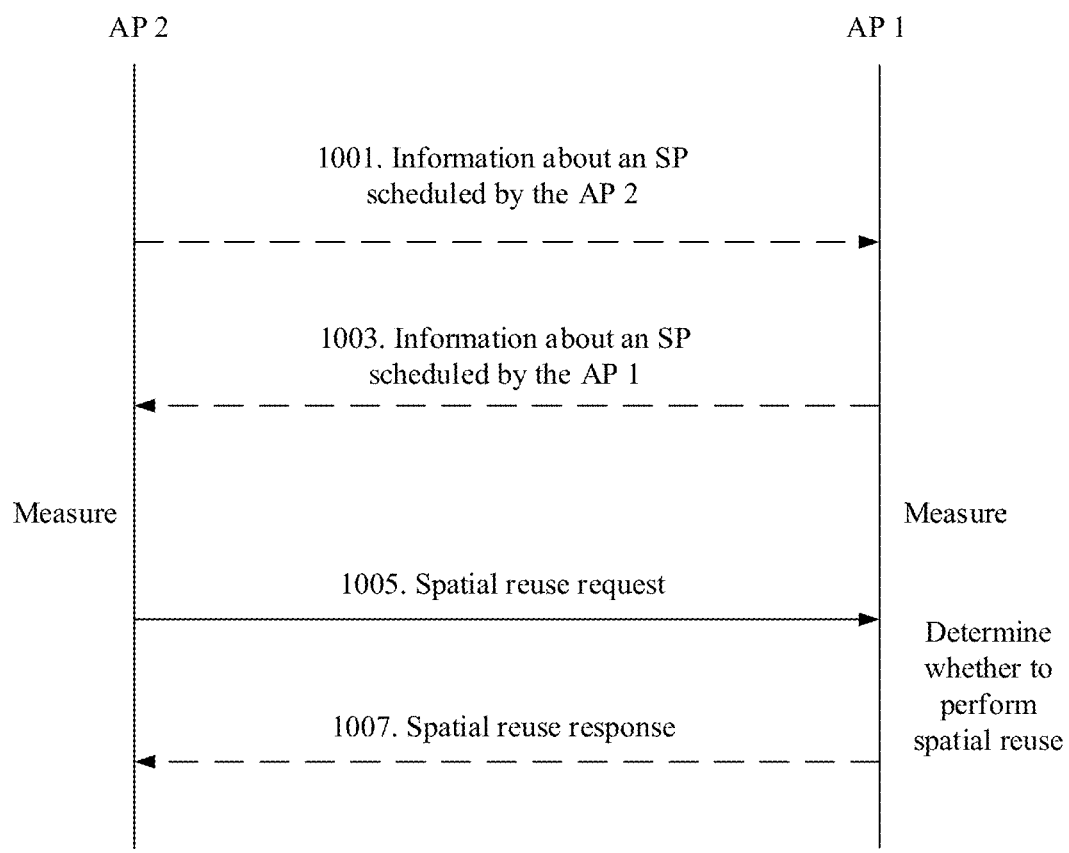
FIG. 10 is a schematic flowchart of a method according to another embodiment of this application.

The following describes this embodiment with reference to FIG. 10.

1001: A second node in a second basic service set BSS2 sends information about one or more service periods (which may be marked as SP2 for the convenience of description), where one or more second service periods SP2 are allocated in the BSS2. The information may be sent in a broadcast or multicast manner, or the information is sent to a first node in a first basic service set BSS1. Correspondingly, the first node in the BSS1 may receive the information about the one or more second service periods SP2. Certainly, in addition to the information about the SP2, the second node in the BSS2 may further send information about another SP. This step is optional.

Optionally, the first node in the BSS1 receives the information about the one or more second service periods SP2 sent by the second node in the BSS2, and the first node in the BSS1 and/or another node that is scheduled by the first node in the BSS1 and that is in the BSS1 measure the one or more second service periods SP2. If the second node in the BSS2 further sends the information about the another SP in addition to the information about the SP2, the first node in the BSS1 and/or the another node that is scheduled by the first node in the BSS1 and that is in the BSS1 may further measure the another SP.

1003: The first node in the first basic service set BSS1 sends information about one or more first service periods (which may be marked as SP1 for the convenience of description), where one or more first service periods SP1 are allocated in the BSS1. The information may be sent in a broadcast or multicast manner, or the information is sent to the second node in the second basic service set BSS2. Correspondingly, the second node in the BSS2 may receive the information about the one or more first service periods SP1. Certainly, in addition to the information about the SP1, the first node in the BSS1 may send information about another SP. This step is optional.

Optionally, the second node in the BSS2 receives the information about the one or more first service periods SP1 sent by the first node in the BSS1, and the second node in the BSS2 and/or another node that is scheduled by the second node in the BSS2 and that is in the BSS2 measure the one or more first service periods SP1. If the first node in the BSS1 further sends the information about the another SP in addition to the information about the SP1, the second node in the BSS2 and/or the another node that is scheduled by the second node in the BSS2 and that is in the BSS2 may further measure the another SP.

The measurement method may be performed based on the foregoing embodiment, and details are not described herein again.

1005: The second node in the BSS2 sends a spatial reuse request. Correspondingly, the first node in the BSS1 may receive the spatial reuse request sent by the second node in the BSS2, where the spatial reuse request includes the information about the one or more second service periods SP2 and/or the information about the one or more first service periods SP1, the information about the SP2 includes spatial reuse status information of the SP2, and spatial reuse status information of an SP is used to indicate a spatial reuse status of the SP.

The one or more first service periods SP1 may have same duration, or may have different duration. The first service periods SP1 are not limited to being the same. Same understanding is applicable to the one or more second service periods SP2.

The first node in the BSS1 determines, based on a spatial reuse status of the SP1 and the received spatial reuse status information of the SP2, whether to allow spatial reuse of the one or more second service periods SP2 and the one or more first service periods SP1.

Figure 12A:
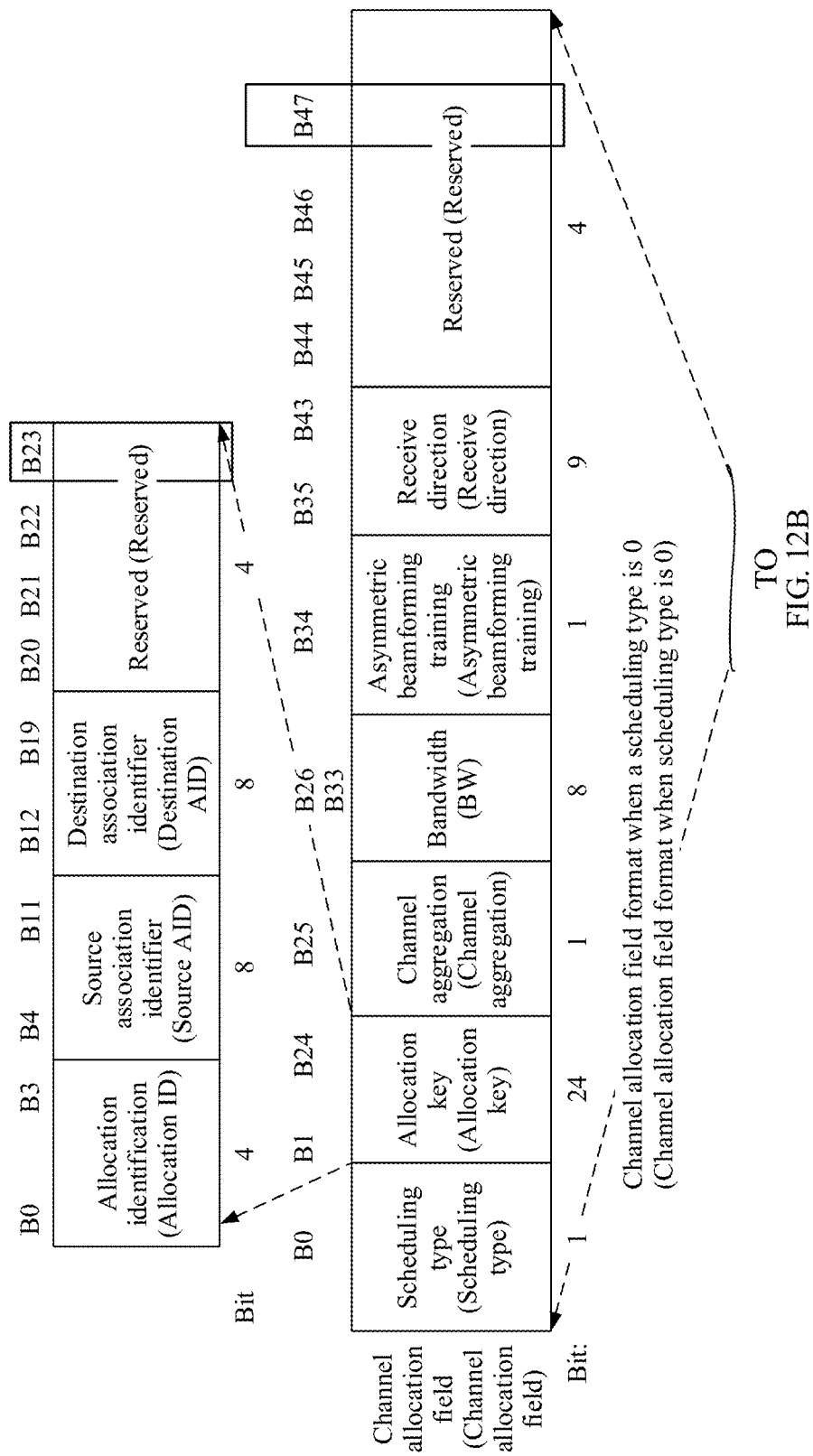

This embodiment introduces spatial reuse status information of an SP, and the spatial reuse status information is used to indicate a spatial reuse status of the SP. The spatial reuse status information of the SP, for example, may be represented by using flag information of the SP. Optionally, the flag information is a first state, and it may be considered as a first state of the SP spatial reuse status, and for example, is marked as 1. The following provides a description by using this as an example, and it indicates that the SP can be used as a request spatial reuse SP or a target spatial reuse SP. The flag information is a second state, for example, is 0. The following provides a description by using this as an example, and it indicates that the SP cannot be used as a request spatial reuse SP or a target spatial reuse SP. The flag information of the SP may be carried in a plurality of information elements for sending, for example, carried in extended schedule information or a beacon. For details, refer to one or more red information bits in FIG. 12A to FIG. 12C.

The request spatial reuse SP may be an SP requesting spatial reuse assessment with another SP, or may be an SP that can be re-scheduled, or may be an SP that may be considered to be re-allocated. The target spatial reuse SP may be an SP that has been scheduled, or may be an SP that may be used for spatial reuse assessment together with the request spatial reuse SP. Understandings of the request spatial reuse SP and the target spatial reuse SP may not be limited to the foregoing description.

BSS2 receives the spatial reuse indication sent by the first node in the BSS1, and learns about an SP that is scheduled by the first node in the BSS1 and on which spatial reuse can be performed. It may be further understood that the second node in the BSS2 learns about information about one or more first service periods SP1 scheduled by the first node in the BSS1.

Before spatial reuse, flag information of an SP is 1, and it indicates that the SP can be used as a request spatial reuse SP or a target spatial reuse SP. After spatial reuse is performed on the SP2 and the SP1, an interval of the SP2 needs to be moved to an interval of the SP1, and the intervals overlap or partially overlap. Flag information of the SP2 is set to 0, and flag information of the SP1 is still 1. An SP whose flag information is 0 cannot be used as a request spatial reuse SP or a target spatial reuse SP, and therefore, no spatial reuse request can be initiated to the SP whose flag information is 0 and/or the SP whose flag information is 0 cannot accept a spatial reuse request. SPs that reuse one or more intervals and on which spatial reuse has been performed may form a spatial reuse SP set. In this set, a node to which an SP whose flag information is 1 is allocated is a central node, and only the central node can initiate or accept the spatial reuse request related to the SP whose flag information is 1.

Optionally, the first node in the BSS1 determines, based on the spatial reuse status of the SP1, the received spatial reuse status information of the SP2, and a result of measuring the one or more second service periods SP2 by the first node in the BSS1 and/or the another node that is scheduled by the first node in the BSS1 and that is in the BSS1, whether reuse can be performed on the request spatial reuse SP2 and the target spatial reuse SP1.

Optionally, the spatial reuse request further includes information about a result of measuring the one or more first service periods SP1 by the second node in the BSS2 and/or the another node that is scheduled by the second node in the BSS2 and that is in the BSS2. The first node in the BSS1 determines, based on spatial reuse status information of the SP1, the received spatial reuse status information of the SP2, and the information about the result of measuring the one or more first service periods SP1 by the second node in the BSS2 and/or the another node that is scheduled by the second node in the BSS2 and that is in the BSS2, whether to allow spatial reuse of the one or more second service periods SP2 and the one or more first service periods SP1.

Certainly, the spatial reuse request further includes information about a link quality or channel measurement result of another SP object in a spatial reuse SP set of the one or more second service periods SP2. The first node in the BSS1 determines, based on the spatial reuse status information of the SP1, the received spatial reuse status information of the SP2, and the information about the link quality or channel measurement result of the another SP object in the spatial reuse SP set of the one or more second service periods SP2, whether to allow spatial reuse of the one or more second service periods SP2 and the one or more first service periods SP1.

Optionally, the first node in the BSS1 determines, based on the spatial reuse status information of the SP1, the received spatial reuse status information of the SP2, and a link quality or channel measurement result of another SP object in a spatial reuse SP set of the one or more first service periods SP1, whether to allow spatial reuse of the one or more second service periods SP2 and the one or more first service periods SP1.

Optionally, the first node in the BSS1 performs determining based on one or more of the determining elements mentioned above. Details are not described herein again.

During implementation, there may be a plurality of specific determining methods. The specific determining methods include, but not limited to, the following several methods.

If no spatial reuse has been performed on the target spatial reuse SP such as the SP1 and an SP scheduled by another node, the first node in the BSS1 may directly determine, based on a result of measuring the SP2 by the first node in the BSS1 and a result of measuring the target spatial reuse SP1 by the second node in the BSS1, whether spatial reuse can be performed on the request spatial reuse SP such as the SP2.

If spatial reuse has been performed on the SP1 and an SP that is scheduled by another node, and the flag information of the SP1 is, for example, 1, the first node in the BSS1 needs to determine, based on a result of measuring the SP1 and the link quality or channel measurement result of the another SP object in the spatial reuse SP set of the SP1, whether spatial reuse can be performed on the SP2.

If spatial reuse has been performed on the SP1 and an SP that is scheduled by another node, and the flag information of the SP1 is a second state, for example, is 0 (because update of the flag information of the SP1 may be delayed), the first node in the BSS1 may reject the spatial reuse request of the second node in the BSS2.

Before the second node in the BSS2 sends the spatial reuse request to the first node in the BSS1, if spatial reuse has been performed on the SP2 and an SP that is scheduled by another node, when sending a channel request to the first node in the BSS1, the second node in the BSS2 sends information about a link quality or channel measurement result of an SP object in the spatial reuse SP set of the SP2 to the first node in the BSS1. The first node in the BSS1 then determines, with reference to the information, whether spatial reuse can be performed on the SP and the SP1 (or the spatial reuse SP set of the SP1). Spatial reuse can be performed only when spatial reuse can be performed on all SPs.

1007: The first node in the BSS1 sends a response to the spatial reuse request to the second node in the BSS2, where the response to the spatial reuse request is used to indicate whether to allow spatial reuse of the one or more second service periods SP2 and the one or more first service periods SP1. Correspondingly, the second node in the BSS2 may receive the response to the spatial reuse request, and perform spatial reuse on SPs based on the response to the spatial reuse request. Further, the second node in the BSS2 sets the spatial reuse status information of the one or more second service periods SP2 to change from the first state to the second state. 1007 is optional.

Figure 11:
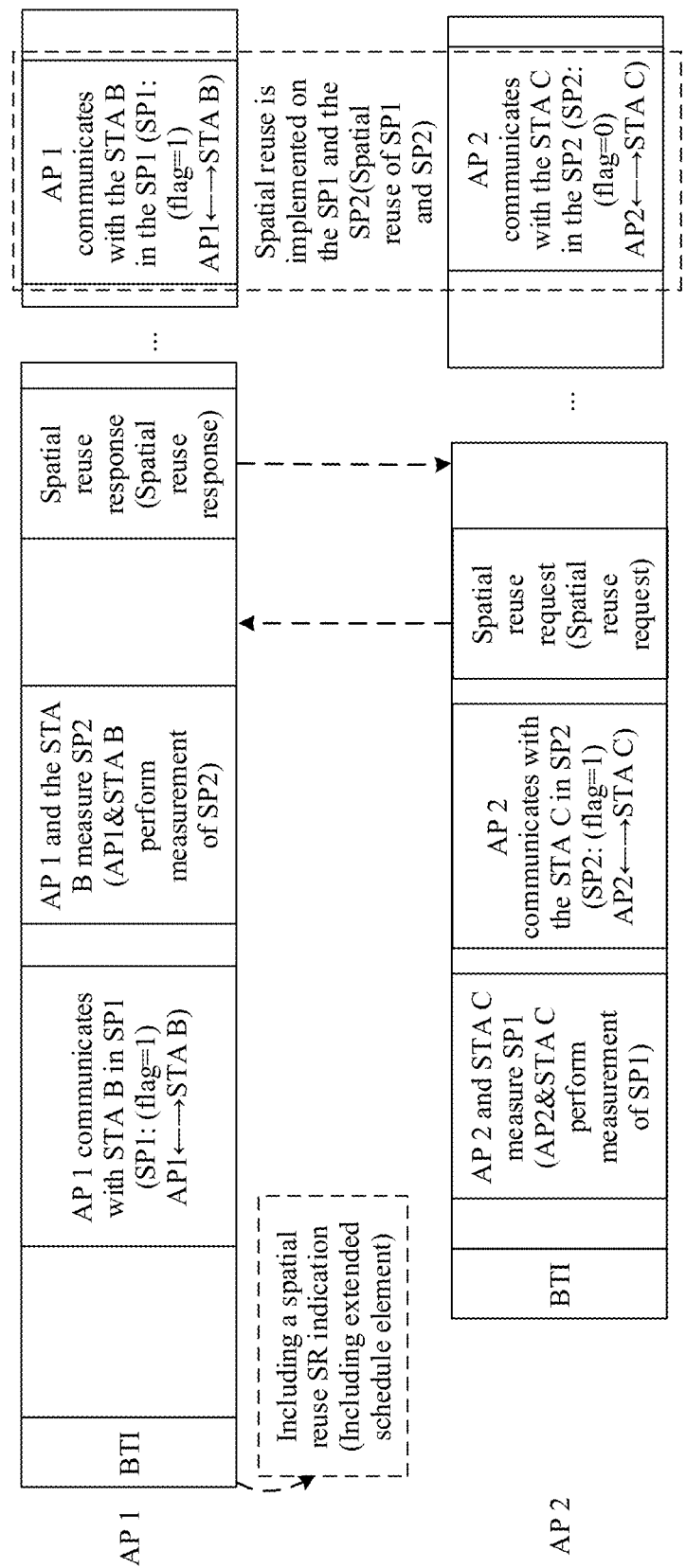
FIG. 11 is a schematic diagram of an interval process according to another embodiment of this application.

A specific example is as follows:

As shown in FIG. 11, when data is transmitted in an SP scheduled by the first node in the BSS1, the second node in the BSS2 enables a STA of one or more scheduled SP objects to perform channel quality measurement, and the second node in the BSS2 collects a measurement result. Similarly, when data is transmitted in an SP scheduled by the second node in the BSS2, the first node in the BSS1 also enables a STA of one or more scheduled SP objects to perform channel quality measurement, and the first node in the BSS1 collects a measurement result.

The second node in the BSS2 initiates a spatial reuse request to the first node in the BSS1 based on the measurement result. The request information includes information about a request spatial reuse SP, for example, information about the SP2 in the figure, and/or information about a target spatial reuse SP, for example, information about the SP1 in the figure. The request information may further include information about a link quality or channel measurement result of the request spatial reuse SP2. The information may be used for the first node in the BSS1 to determine whether an SP in another BSS can join in the spatial reuse set of the SP1 in the future. Certainly, the measurement request may further carry a plurality of pieces of information, for example, information mentioned in the embodiment of FIG. 10.

The first node in the BSS1 determines, based on a spatial reuse status of the SP1, whether spatial reuse can be performed on the SP1 and the SP2, which may include, but not limited to, one or more of the following determining cases:

Regardless of whether spatial reuse may be performed on the SP2, the first node in the BSS1 can reply with information, for example, send a spatial reuse response, to indicate whether spatial reuse can be performed on the SP2 and the SP1. If spatial reuse can be performed on the SP2, the second node in the BSS2 may move the interval of the SP2 to the interval of the SP1 during next scheduling, and change the flag information of the SP2 to 0.

In the foregoing process, an SP whose flag information is the first state is equivalent to a central SP in a spatial reuse SP set. According to the flag information, only a node of the central SP can receive/initiate a spatial reuse request. Therefore, a process of interaction between a plurality of APs is reduced, and a delay and complexity are reduced.

Figure 13:
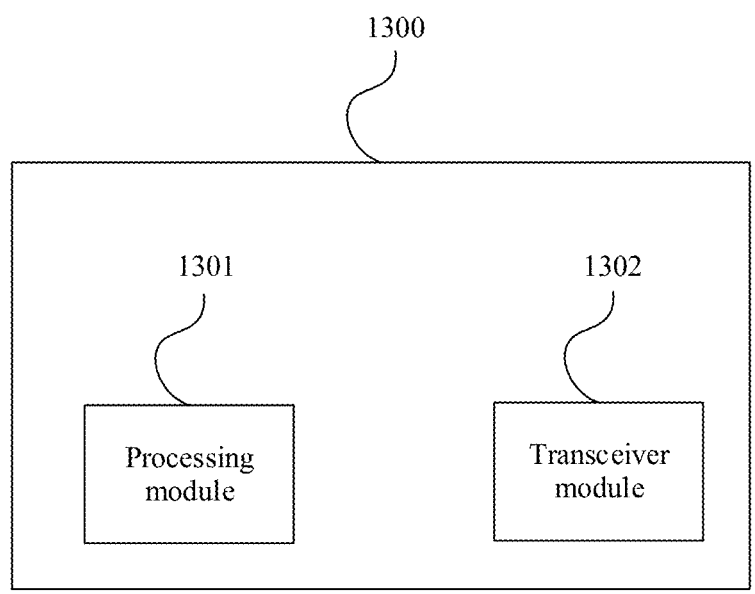
FIG. 13 is a schematic structural diagram of an apparatus according to an embodiment of this application.

FIG. 13 is a schematic structural diagram of another apparatus according to an embodiment of this application. As shown in FIG. 13, an apparatus 1300 may include:

a processing module 1301, configured to implement another processing process except sending and receiving in any one of the foregoing method embodiments, where the processing module may be implemented by using a processing circuit, a processor, or a chip; and a transceiver module 1302, configured to implement another processing process except sending and receiving in any one of the foregoing method embodiments, where the processing module may be implemented by using a processing circuit, a processor, or a chip; and the transceiver module may alternatively be implemented by a receiver circuit or a transmitter circuit, or implemented by a receiver and a transmitter, or implemented by a receiver chip and a transmitter chip, and is configured to separately implement a sending or receiving processing process in any one of the foregoing method embodiments.

Figure 14:
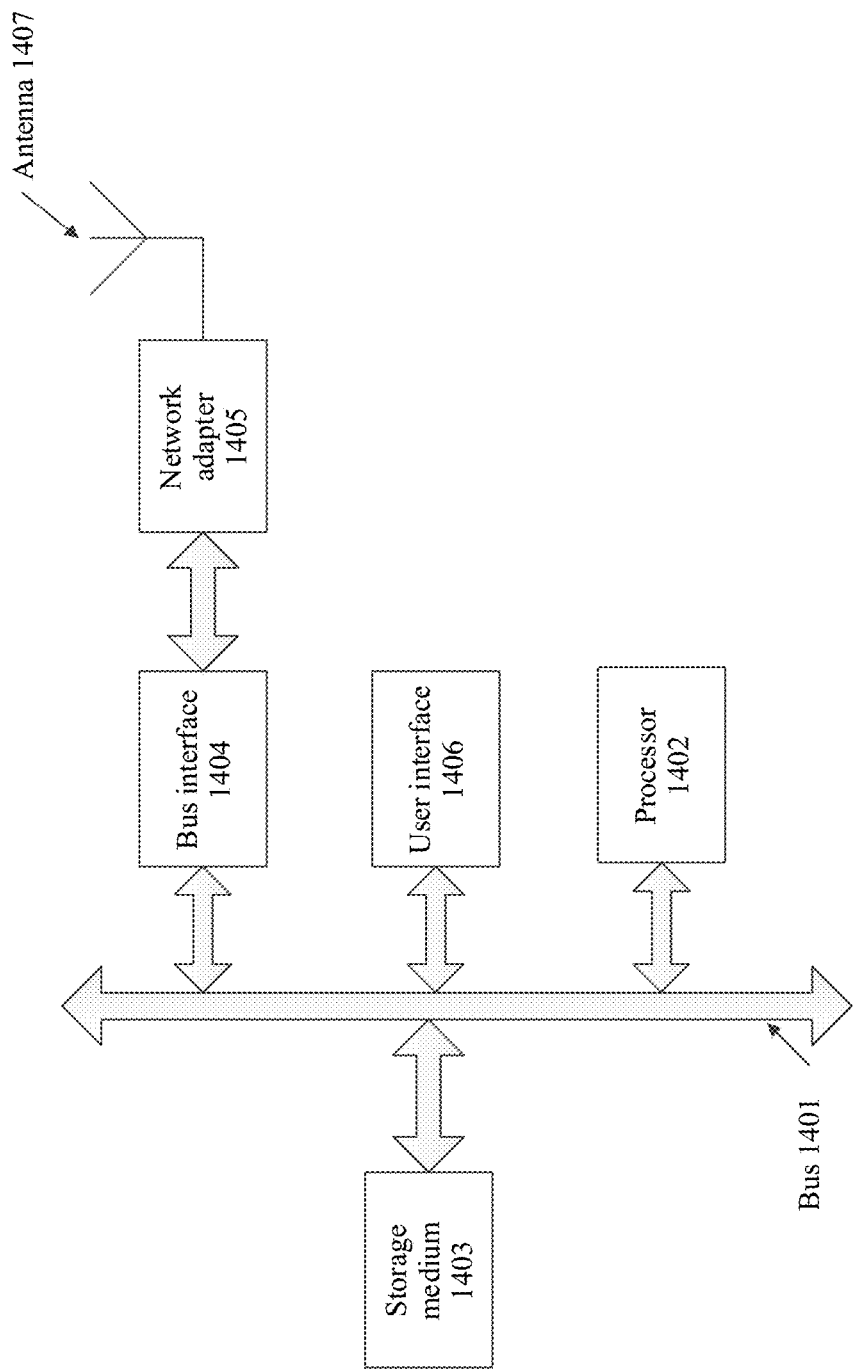
FIG. 14 is a schematic structural diagram of an apparatus according to another embodiment of this application.

The following describes a specific product form in FIG. 13 with reference to FIG. 14. FIG. 14 is a schematic structural diagram of an apparatus according to an embodiment of this application. The apparatus in FIG. 13 may be implemented in a plurality of product forms.

For example, in a possible product form, the apparatus may be optionally implemented by using a bus 1401 as a general bus architecture. As shown in FIG. 14, the bus 1401 may include any quantity of interconnect buses and bridges based on a specific application and an overall design constraint of the apparatus. The bus 1401 connects various circuits together. These circuits include a processor 1402, and optionally include one or more of a storage medium 1403, a bus interface 1404, or a user interface 1406.

The apparatus uses the bus interface 1404 to connect an optional component, such as a network adapter 1405, and the like by using the bus 1401. The network adapter 1405 may be configured to: implement a signal processing function at a physical layer in a wireless local area network, and send and receive a radio frequency signal by using an antenna 1407. In this application, the antenna 1407 is configured to implement information receiving and sending performed by the apparatus in the foregoing method embodiments.

The user interface 1406 may be connected to a user terminal such as a keyboard, a display, a mouse, or a joystick. The bus 1401 may be further connected to various other circuits such as a timing source, a peripheral device, a voltage regulator, and a power management circuit. These circuits are well-known in the art, and therefore are not described in detail.

The processor 1402 is responsible for bus management and general processing (including executing software stored in the storage medium 1403). The processor 1402 may be implemented by using one or more general-purpose processors and/or dedicated processors. For example, the processor includes a microprocessor, a microcontroller, a DSP processor, and another circuit that can execute software. The software should be broadly construed as representation of an instruction, data, or any combination thereof, regardless of whether the software is referred to as software, firmware, middleware, microcode, a hardware description language, or the like. In this application, the processor 1402 is configured to implement all processing except information receiving and sending performed by the apparatus in the foregoing method embodiments.

In addition, in FIG. 14, the storage medium 1403 is separated from the processor 1402. However, a person skilled in the art easily understands that the storage medium 1403 or any part of the storage medium 1403 may be located outside the apparatus. For example, the storage medium 1403 may include a transmission line, a carrier waveform modulated by using data, and/or a computer product separated from a wireless apparatus. These media may be accessed by the processor 1402 by using the bus interface 1404. Alternatively, the storage medium 1403 or any part of the storage medium 1403 may be integrated into the processor 1402. For example, the storage medium 1403 may be a cache and/or a general-purpose register. In this application, the storage medium 1403 is configured to store a computer program, and the computer program is executed by the processor 1402, to implement all processing performed by the processor 1402.

Alternatively, in another possible product form, the first apparatus may be configured as a general-purpose processing system, for example, collectively referred to as a chip. The general-purpose processing system includes one or more microprocessors providing a processor function, and an external memory providing at least a part of the storage medium 1403. All of these are connected to another support circuit by using an external bus architecture.

Alternatively, in another possible product form, the apparatus may be implemented by using the following: an application-specific integrated circuit (application-specific integrated circuit, ASIC) having the processor 1402, the bus interface 1404, and the user interface 1406, and at least a part of the storage medium 1403 integrated in a single chip.

Figure 15:
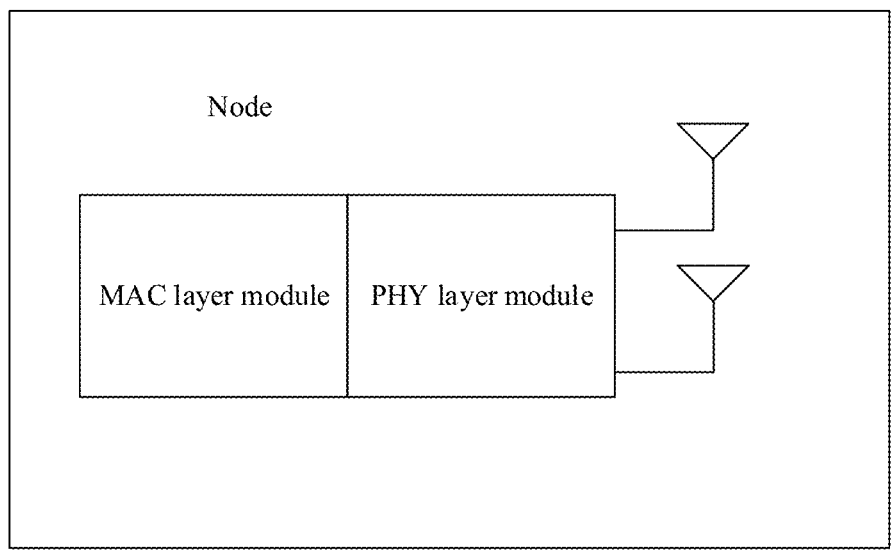
FIG. 15 is a schematic structural diagram of an apparatus according to another embodiment of this application.

FIG. 15 is a schematic structural diagram of an apparatus according to an embodiment of this application. As shown in FIG. 15, the apparatus includes a media access control (Media Access Control, MAC) layer module and a physical (PHY) layer module. The MAC layer module may perform MAC layer protocol processing on to-be-sent information, and transmit the to-be-sent information to the physical layer module; and the physical layer module then performs physical layer protocol processing, and then sends the to-be-sent information by using an antenna. The physical layer module may perform physical layer protocol processing on information received by the antenna, and transmit the information to the MAC layer module; and the MAC layer module then performs MAC layer protocol processing, to obtain actual received information. It should be noted that the apparatus shown in FIG. 15 uses only two antennas as an example. Certainly, another quantity of antennas may also be included. In other words, the apparatus may be a single-antenna apparatus, or may be a multi-antenna apparatus. The multi-antenna is not limited to two shown in FIG. 15, and may alternatively be another quantity.

The apparatus may be an access point AP or a station STA. The method embodiments may be cited to supplement descriptions of the foregoing apparatus embodiments.

The content of the claims is also used as a part of the embodiments to supplement the descriptions of the embodiments.

"A and/or B" in this application document represents "A", "B", or "A and B". Content of the implementations of this application may be mutually cited.

Terminologies such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with another system by using a signal).

The apparatus in the implementation of this application may be a field-programmable gate array (Field-Programmable Gate Array, FPGA), an application-specific integrated chip (Application-Specific Integrated Circuit, ASIC), a system on chip (System on Chip, SoC), a central processing unit (Central Processing Unit, CPU), a network processor (Network Processor, NP), a digital signal processor (Digital Signal Processor, DSP), a micro controller (Micro Controller Unit, MCU), a programmable logic device (Programmable Logic Device, PLD), or another integrated chip.

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again. For ease of brevity, each embodiment may also be used as mutual reference, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the present invention essentially, or the part contributing to the related art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A spatial reuse apparatus, wherein the apparatus is located in a first basic service set BSS1; wherein the apparatus comprising: a processor and a memory, the memory is configured to store a program, and the program when executed by the processor, cause the apparatus to receive a measurement request sent by a node in a second basic service set BSS2, wherein one or more first service periods SP1 are allocated in the BSS1, one or more second service periods SP2 are allocated in the BSS2, and the measurement request is used to request to measure the one or more second service periods SP2; and receive a measurement report of the node in the BSS2, wherein the measurement report is a report of measuring the one or more first service periods SP1; and determine, based on the received measurement report, whether to allow spatial reuse of the one or more first service periods SP1 and the one or more second service periods SP2.

2. The apparatus according to claim 1, wherein the program when executed by the processor, cause the apparatus further to measure the one or more second service periods SP2, and/or schedule another node in the BSS1 to measure the one or more second service periods SP2.

3. The apparatus according to claim 2, wherein the program when executed by the processor, cause the apparatus further to
determine, based on the received measurement report and a result of measuring the one or more second service periods SP2, whether to allow the spatial reuse of the one or more first service periods SP1 and the one or more second service periods SP2.

4. The apparatus according to claim 1, wherein the program when executed by the processor, cause the apparatus further to:
send a response to the measurement request, wherein the response to the measurement request is a response to the measurement request; and/or
send a response to the measurement report, wherein the response to the measurement report comprises an indication used to indicate whether to allow the spatial reuse of the one or more first service periods SP1 and the one or more second service periods SP2.

5. A spatial reuse apparatus, wherein the apparatus is located in a second basic service set BSS2; and wherein the apparatus comprising: a processor and a memory, the memory is configured to store a program, and the program when executed by the processor, cause the apparatus to:
send a measurement request to a first node in a first basic service set BSS1, wherein one or more first service periods SP1 are allocated in the BSS1, one or more second service periods SP2 are allocated in the BSS2, and the measurement request is used to request to measure the one or more second service periods SP2; and
send a measurement report to the first node in the BSS1, wherein the measurement report is a report of measuring the one or more first service periods SP1, and the measurement report is used to determine whether to allow spatial reuse of the one or more first service periods SP1 and the one or more second service periods SP2.

6. The apparatus according to claim 5, wherein the program when executed by the processor, cause the apparatus further to:
measure the one or more first service periods SP1, and/or schedule another node in the BSS2 to measure the one or more first service periods SP1.

7. The apparatus according to claim 5, wherein the program when executed by the processor, cause the apparatus further to:
receive a response to the measurement request from the node in the BSS1, wherein the response to the measurement request is a response to the measurement request; and/or
receive a response to the measurement report from the node in the BSS1, wherein the response to the measurement report is a response to the measurement report.

8. The apparatus according to claim 7, wherein the program when executed by the processor, cause the apparatus further to:
schedule, based on the response to the measurement report, the one or more second service periods SP2 and the one or more first service periods SP1 to perform the spatial reuse.

9. A spatial reuse apparatus, wherein the apparatus is located in a first basic service set BSS1; wherein the apparatus comprising: a processor and a memory, the memory is configured to store a program, and the program when executed by the processor, cause the apparatus to:
receive a spatial reuse request sent by a node in a second basic service set BSS2, wherein one or more first service periods SP1 are allocated in the BSS1, one or more second service periods SP2 are allocated in the BSS2, the spatial reuse request comprises information about the one or more second service periods SP2 and/or information about the one or more first service periods SP1, the information about the SP2 comprises spatial reuse status information of the SP2, and spatial reuse status information of an SP is used to indicate a spatial reuse status of the SP; and
determine, based on a spatial reuse status of the SP1 and the received spatial reuse status information of the SP2, whether to allow spatial reuse of the one or more second service periods SP2 and the one or more first service periods SP1.

10. The apparatus according to claim 9, wherein
the spatial reuse status of the SP comprises a first state or a second state, the first state is used to indicate that the SP can be used as a request spatial reuse SP or a target spatial reuse SP, and the second state indicates that the SP cannot be used as a request spatial reuse SP or a target spatial reuse SP, wherein the request spatial reuse SP is an SP requesting spatial reuse assessment with another SP, or an SP that can be re-scheduled, or an SP that is considered to be re-allocated, and the target spatial reuse SP is an SP that has been scheduled, or an SP that is used for spatial reuse assessment together with the request spatial reuse SP.

11. The apparatus according to claim 9, wherein the program when executed by the processor, cause the apparatus further to:
send a response to the spatial reuse request to the node in the BSS2, wherein the response to the spatial reuse request is used to indicate whether to allow the spatial reuse of the one or more second service periods SP2 and the one or more first service periods SP1.

12. The apparatus according to claim 9, wherein
the spatial reuse request further comprises information about a link quality or channel measurement result of another SP object in a spatial reuse SP set of the one or more second service periods SP2; and
the program when executed by the processor, cause the apparatus further to: determine, based on the spatial reuse status information of the SP1, the received spatial reuse status information of the SP2, and the information about the link quality or channel measurement result of the another SP object in the spatial reuse SP set of the one or more second service periods SP2, whether to allow the spatial reuse of the one or more second service periods SP2 and the one or more first service periods SP1.

13. A spatial reuse apparatus, wherein the apparatus is located in a second basic service set BSS2; and wherein the apparatus comprising: a processor and a memory, the memory is configured to store a program, and the program when executed by the processor, cause the apparatus to:
send a spatial reuse request to a node in a first basic service set BSS1, wherein one or more first service periods SP1 are allocated in the BSS1, one or more second service periods SP2 are allocated in the BSS2, the spatial reuse request comprises information about the one or more second service periods SP2 and/or information about the one or more first service periods SP1, the information about the SP2 comprises spatial reuse status information of the SP2, spatial reuse status information of an SP is used to indicate a spatial reuse status of the SP, and the spatial reuse request is used to request to perform spatial reuse of the one or more first service periods SP1 and the one or more second service periods SP2.

14. The apparatus according to claim 13, wherein the program when executed by the processor, cause the apparatus further to:
receive a response to the spatial reuse request from the node in the BSS1, wherein the response to the spatial reuse request is used to indicate whether to allow the spatial reuse of the one or more second service periods SP2 and the one or more first service periods SP1; and
enable, based on the received response to the spatial reuse request, the spatial reuse of the one or more second service periods SP2 and the one or more first service periods SP1.

15. The apparatus according to claim 13, wherein the program when executed by the processor, cause the apparatus further to:
set the spatial reuse status information of the one or more second service periods SP2 to change from a first state to a second state, wherein the first state is used to indicate that the SP can be used as a request spatial reuse SP or a target spatial reuse SP, and the second state indicates that the SP cannot be used as a request spatial reuse SP or a target spatial reuse SP, wherein the request spatial reuse SP is an SP requesting spatial reuse assessment with another SP, or an SP that can be re-scheduled, or an SP that is considered to be re-allocated, and the target spatial reuse SP is an SP that has been scheduled, or an SP that is used for spatial reuse assessment together with the request spatial reuse SP.

* * * * *